(12) United States Patent
Esenlik et al.

(10) Patent No.: US 11,089,336 B2
(45) Date of Patent: *Aug. 10, 2021

(54) SYNTAX AND SEMANTICS FOR ADAPTIVE LOOP FILTER AND SAMPLE ADAPTIVE OFFSET

(71) Applicant: Sun Patent Trust, New York, NY (US)

(72) Inventors: Semih Esenlik, Nazilli (FR); Matthias Narroschke, Schaafheim (DE); Steffen Kamp, Frankfurt (DE); Thomas Wedi, The Hague (NL)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/778,239

(22) Filed: Jan. 31, 2020

(65) Prior Publication Data

US 2020/0236404 A1    Jul. 23, 2020

Related U.S. Application Data

(63) Continuation of application No. 14/499,978, filed on Sep. 29, 2014, now Pat. No. 10,595,049, which is a
(Continued)

(51) Int. Cl.
*H04N 19/70* (2014.01)
*H04N 19/117* (2014.01)
(Continued)

(52) U.S. Cl.
CPC ........... *H04N 19/70* (2014.11); *H04N 19/117* (2014.11); *H04N 19/174* (2014.11); *H04N 19/463* (2014.11); *H04N 19/80* (2014.11)

(58) Field of Classification Search
CPC ............. H04N 19/0089; H04N 19/117; H04N 19/174; H04N 19/463; H04N 19/70; H04N 19/80
(Continued)

(56) References Cited

U.S. PATENT DOCUMENTS 8,831,107 B2    9/2014  Zheng
9,485,521 B2   11/2016  Lim
(Continued)

FOREIGN PATENT DOCUMENTS

WO    2011/005317    1/2011

OTHER PUBLICATIONS

International Search Report and Written Opinion of the International Searching Authority dated Jul. 3, 2013 in corresponding International Application No. PCT/EP2013/056401.
(Continued)

*Primary Examiner* — Joseph G Ustaris
*Assistant Examiner* — Jimmy S Lee
(74) *Attorney, Agent, or Firm* — Wenderoth, Lind & Ponack, L.L.P.

(57) ABSTRACT

The present invention provides an improved video encoding and decoding method, which maintains the advantages of LCU-based filter parameter signaling as compared to frame-based filter parameter signaling, but considerably reduces signaling overhead. Therefore, signaling syntax is modified by grouping LCUs (Largest Coding Units) together for signaling employing a mapping function. Consequently, filter parameters no longer need to be signaled for each single LCU, but for a group of several LCUs. The syntax structure of the invention avoids redundancies present in the state of the art as far as possible and thus increases the information content of the syntax elements. At the decoder side, the mapping function is applied to infer information about the filter parameters to be applied to a current LCU from information encoded in different syntax structures.

1 Claim, 34 Drawing Sheets

Related U.S. Application Data continuation of application No. PCT/EP2013/056401, filed on Mar. 26, 2013.

(60) Provisional application No. 61/617,915, filed on Mar. 30, 2012.

(51) Int. Cl.
*H04N 19/174* (2014.01)
*H04N 19/463* (2014.01)
*H04N 19/80* (2014.01)

(58) Field of Classification Search
USPC ..................................................... 375/240.29
See application file for complete search history.

(56) References Cited

U.S. PATENT DOCUMENTS

| | | | |
|---|---|---|---|
| 2010/0091858 A1* | 4/2010 | Yang .................... | H04N 19/107 375/240.13 |
| 2010/0128797 A1 | 5/2010 | Dey | |
| 2011/0228844 A1 | 9/2011 | Watanabe | |
| 2011/0274158 A1 | 11/2011 | Fu et al. | |
| 2012/0039383 A1 | 2/2012 | Huang | |
| 2012/0106622 A1* | 5/2012 | Huang ................. | H04N 19/426 375/240.01 |
| 2012/0177104 A1 | 7/2012 | Budagavi | |
| 2012/0177107 A1 | 7/2012 | Fu | |
| 2012/0294353 A1* | 11/2012 | Fu ........................ | H04N 19/176 375/240.02 |
| 2013/0121416 A1 | 5/2013 | He | |
| 2013/0156097 A1* | 6/2013 | Budagavi ............... | H04N 19/82 375/240.02 |

OTHER PUBLICATIONS

B. Bross et al., "High efficiency video coding (HEVC) text specification draft 6", Joint Collaborative Team on Video Coding (JCT-VC) of ITU-T SG16 WP3 and ISO/IEC JTC1/SC29/WG11, JCTVC-H1003-Version 20, 7th Meeting: Geneva, CH, Nov. 21-30, 2011, XP055066933, pp. 1-249.

Chin-Ming Fu et al., "Sample Adaptive Offset With LCU-based Syntax", Joint Collaborative Team on Video Coding (JCT-VC) of ITU-T SG16 WP3 and ISO/IEC JTC1/SC29/WG11, JCTVC-F056, 6th Meeting: Torino, IT, Jul. 14-22, 2011, XP030009079, pp. 1-6.

Ching-Yeh Chen et al., "CE8.a.4: One-stage/Two-stage SAO and ALF With LCU-based syntax", Joint Collaborative Team on Video Coding (JCT-VC) of ITU-T SG16 WP3 and ISO/IEC JTC1/SC29/WG11, JCTVC-H0274, 8th Meeting: San Jose, CA, USA, Feb. 1-10, 2012, XP030111301, pp. 1-18.

Semih Esenlik et al., "Refinement for SAO and ALF syntax in the APS", Joint Collaborative Team on Video Coding (JCT-VC) of ITU-T SG16 WP3 and ISO/IEC JTC 1/SC29/WG11, JCTVC-I0171, 9th Meeting: Geneva, CH, Apr. 27-May 7, 2012, XP030052755, pp. 1-11.

A. Fuldseth et al., "CE8: ALF with low latency and reduced complexity for HEVC", Joint Collaborative Team on Video Coding (JCT-VC) of ITU-T SG16 WP3 and ISO/IEC JTC1/SC29/WG11, JCTVC-G498 Version 3, 7th Meeting: Geneva, CH, Nov. 21-30, 2011, pp. 1-4.

Benjamin Bross et al., "High efficiency video coding (HEVC) text specification draft 6", Joint Collaborative Team on Video Coding (JCT-VC) of ITU-T SG16 WP3 and ISO/IEC JTC1/SC29/WG11, JCTVC-H1003-Version 21, 7th Meeting: Geneva, CH, Nov. 21-30, 2011, pp. 1-249.

Benjamin Bross et al., "WD5: Working Draft 5 of High-Efficiency Video Coding", Joint Collaborative Team on Video Coding (JCT-VC) of ITU-T SG16 WP3 and ISO/IEC JTC1/SC29/WG11, JCTVC-G1103-Version 10, 7th Meeting: Geneva, CH, Nov. 21-30, 2011, pp. 1-214.

International Preliminary Report on Patentability dated Oct. 8, 2014 in corresponding International Application No. PCT/EP2013/056401.

Written Opinion of the International Preliminary Examining Authority dated Jul. 16, 2014 in corresponding International Application No. PCT/EP2013/056401.

* cited by examiner

| | | | |
|---|---|---|---|
| | SAOP2 | SAOP2 | SAOP4 |
| use the SAOP of the above LCU ← | SAOP2<br>run=1<br>no merge-above | SAOP2<br>d_run=0<br>merge-above=1 | SAOP4 |
| | SAOP1 | SAOP3 | SAOP4 |
| | SAOP1 | SAOP3 | SAOP4 |
| | SAOP1<br>run=2<br>no merge-above | SAOP3<br>d_run=0<br>merge-above=0 | SAOP4<br>d_run=2<br>merge-above=0 |

A picture to be encoded

Fig. 3

| | Descriptor |
|---|---|
| aps_rbsp( ) { | |
|   aps_id | ue(v) |
|   aps_scaling_list_data_present_flag | u(1) |
|   if( aps_scaling_list_data_present_flag ) | |
|     scaling_list_param( ) | |
|   aps_deblocking_filter_flag | u(1) |
|   if(aps_deblocking_filter_flag) { | |
|     disable_deblocking_filter_flag | u(1) |
|     if( !disable_deblocking_filter_flag ) { | |
|       beta_offset_div2 | se(v) |
|       tc_offset_div2 | se(v) |
|     } | |
|   } | |
|   aps_sao_interleaving_flag | u(1) |
|   if( !aps_sao_interleaving_flag ) { | |
|     aps_sample_adaptive_offset_flag | u(1) |
|     if( aps_sample_adaptive_offset_flag ) | |
|       aps_sao_param( ) | |
|   } | |
|   aps_adaptive_loop_filter_flag | u(1) |
|   if( aps_adaptive_loop_filter_flag ) | |
|     alf_param( ) | |
|   aps_extension_flag | u(1) |
|   if( aps_extension_flag ) | |
|     while( more_rbsp_data( ) ) | |
|       aps_extension_data_flag | u(1) |
|   rbsp_trailing_bits( ) | |
| } | |

| | Descriptor |
|---|---|
| aps_sao_param( ) { | |
|    sao_cb_enable_flag | u(1) |
|    sao_cr_enable_flag | u(1) |
|    sao_num_lcu_in_width_minus1 | ue(v) |
|    sao_num_lcu_in_height_minus1 | ue(v) |
|    if ( aps_sample_adaptive_offset_flag ){ | |
|      sao_one_luma_unit_flag | u(1) |
|      if (sao_one_luma_unit_flag) | |
|        sao_offset_vlc( 0, 0, 0 ) | |
|    } | |
|    if ( sao_cb_enable_flag ){ | |
|      sao_one_cb_unit_flag | u(1) |
|      if ( sao_one_cb_unit_flag ) | |
|        sao_offset_vlc( 0, 0, 1 ) | |
|    } | |
|    if ( sao_cr_enable_flag ){ | |
|      sao_one_cr_unit_flag | u(1) |
|      if ( sao_one_cr_unit_flag ) | |
|        sao_offset_vlc( 0, 0, 2 ) | |
|    } | |
|    for ( ry = 0; ry < sao_num_lcu_in_height_minus1+1; ry++ ) { | |
|      for ( rx = 0; rx < sao_num_lcu_in_width_minus1+1; rx++ ) { | |
|        if ( aps_sample_adaptive_offset_flag && ! sao_one_luma_unit_flag ) { | |
|          if ( ry > 0 && rx == 0 ) | |
|            sao_repeat_row_flag[ 0 ] | u(1) |
|          sao_unit_vlc(rx, ry, 0 ) | |
|        } | |
|        if ( sao_cb_enable_flag && ! sao_one_cb_unit_flag ) { | |
|          if ( ry > 0 && rx == 0 ) | |
|            sao_repeat_row_flag[ 1 ] | u(1) |
|          sao_unit_vlc(rx, ry, 1 ) | |
|        } | |
|        if ( sao_cr_enable_flag && !sao_one_cr_unit_flag ) { | |
|          if ( ry > 0 && rx == 0 ) | |
|            sao_repeat_row_flag[ 2 ] | u(1) |
|          sao_unit_vlc( rx, ry, 2 ) | |
|        } | |
|      } | |
|    } | |
| } | |

Fig. 5

| | Descriptor |
|---|---|
| alf_param() { | |
|   alf_cb_enable_flag | u(1) |
|   alf_cr_enable_flag | u(1) |
|   alf_one_luma_unit_per_slice_flag | |
|   if( alf_cb_enable_flag ) | |
|     alf_one_cb_unit_per_slice_flag | u(1) |
|   if( alf_cr_enable_flag ) | |
|     alf_one_cr_unit_per_slice_flag | |
|   if( !alf_coef_in_slice_flag ) { | |
|     alf_num_lcu_in_width_minus1 | ue(v) |
|     alf_num_lcu_in_height_minus1 | ue(v) |
|   } else | |
|     alf_num_lcu_in_slice_minus1 | u(v) |
|   endCtbrY = (numCtb − 1 + firstCtbAddr) / numCtbInWidth | |
|   endCtbrX = (numCtb − 1 + firstCtbAddr) % numCtbInWidth | |
|   for( i = 0; i < numCtb; i++ ) { | |
|     rx = (i + firstCtbAddr) % numCtbInWidth | |
|     ry = (i + firstCtbAddr) / numCtbInWidth | |
|     endrX = ( ry == endCtbrY ) ? (endCtbrX) : ( numCtbInWidth − 1 ) | |
|     if( ( rx == 0 ) && ( i − numCtbInWidth >= 0 ) && ( alf_one_luma_unit_per_slice_flag == 0 ) ) | |
|       alf_repeat_row_flag[0] | u(1) |
|     alf_unit(rx, ry, 0, i, endrX, alf_one_luma_unit_per_slice_flag ) | |
|     if( alf_cb_enable_flag ) { | |
|       if( ( rx == 0 ) && ( i − numCtbInWidth >= 0 ) && ( alf_one_cb_unit_per_slice_flag == 0 ) ) | |
|         alf_repeat_row_flag[1] | u(1) |
|       alf_unit(rx, ry, 1, i, endrX, alf_one_cb_unit_per_slice_flag ) | |
|     if( alf_cr_enable_flag ) { | |
|       if( ( rx == 0 ) && ( i − numCtbInWidth>= 0 ) && ( alf_one_cr_unit_per_slice_flag == 0 ) ) | |
|         alf_repeat_row_flag[2] | u(1) |
|       alf_unit(rx, ry, 2, i, endrX, alf_one_cr_unit_per_slice_flag ) | |
|     } | |
|   } | |
| } | |

Fig. 6

| aps_sao_param( ) {         | Descriptor |
|---|---|
| sao_cb_enable_flag | u(1) |
| sao_cr_enable_flag | u(1) |
| sao_num_lcu_in_width_minus1 | ue(v) |
| sao_num_lcu_in_height_minus1 | ue(v) |
| vertical_lcu_grouping_minus1 | ue(v) |
| horizontal_lcu_grouping_minus1 | ue(v) |
| ... | |
| } | |

Fig. 7

| | Descriptor |
|---|---|
| aps_sao_param( ) { | |
|     sao_cb_enable_flag | u(1) |
|     sao_cr_enable_flag | u(1) |
|     aps_num_sao_units_in_width_minus1 | ue(v) |
|     aps_num_sao_units_in_height_minus1 | ue(v) |
|     if (aps_num_sao_units_in_width_minus1 \|\| aps_num_sao_units_in_height_minus1){ | |
|         sao_one_luma_unit_flag | u(1) |
|     else | |
|         sao_one_luma_unit_flag = 1 | |
|     if (sao_one_luma_unit_flag) | |
|         sao_offset_vlc( 0, 0, 0 ) | |
|     if (sao_cb_enable_flag { | |
|         if (aps_num_sao_units_in_width_minus1 \|\| aps_num_sao_units_in_height_minus1) | |
|         sao_one_cb_unit_flag | u(1) |
|     else | |
|         sao_one_cb_unit_flag = 1 | |
|     if ( sao_one_cb_unit_flag ) | |
|         sao_offset_vlc( 0, 0, 1 ) | |
|     } | |
|     if ( sao_cr_enable_flag { | |
|         if (aps_num_sao_units_in_width_minus1 \|\| aps_num_sao_units_in_height_minus1) | |
|     sao_one_cr_unit_flag | u(1) |
|     else | |
|         sao_one_cr_unit_flag = 1 | |
|     if ( sao_one_cr_unit_flag ) | |
|         sao_offset_vlc( 0, 0, 2 ) | |
|     } | |
|     for ( ry = 0; ry < aps_num_sao_units_in_height_minus1 +1; ry++ ) { | |
|         for ( rx = 0; rx < aps_num_sao_units_in_width_minus1 +1; rx++ ) { | |
|             if ( aps_sample_adaptive_offset_flag && ! sao_one_luma_unit_flag ) { | |
|                 if ( ry > 0 && rx == 0 ) | |
|                 sao_repeat_row_flag[ 0 ] | u(1) |
|             sao_unit_vlc(rx, ry, 0 ) | |
|         } | |
|         if ( sao_cb_enable_flag && ! sao_one_cb_unit_flag ) { | |
|             if ( ry > 0 && rx == 0 ) | |
|                 sao_repeat_row_flag[ 1 ] | u(1) |
|             sao_unit_vlc(rx, ry, 1 ) | |
|         } | |
|         if ( sao_cr_enable_flag && !sao_one_cr_unit_flag ) { | |
|             if ( ry > 0 && rx == 0 ) | |
|                 sao_repeat_row_flag[ 2 ] | u(1) |
|             sao_unit_vlc( rx, ry, 2 ) | |
|         } | |
|         } | |
|     } | |
| } | |

Video stream (PID=0x1011, Primary video)
Audio stream (PID=0x1100)
Audio stream (PID=0x1101)
Presentation graphics stream (PID=0x1200)
Presentation graphics stream (PID=0x1201)
Interactive graphics stream (PID=0x1400)
Video stream (PID=0x1B00, Secondary video)
Video stream (PID=0x1B01, Secondary video)

Fig. 33

| Corresponding standard | Driving frequency |
|---|---|
| MPEG-4 AVC | 500 MHz |
| MPEG-2 | 350 MHz |
| ... | ... |

SYNTAX AND SEMANTICS FOR ADAPTIVE LOOP FILTER AND SAMPLE ADAPTIVE OFFSET

CROSS REFERENCE TO RELATED APPLICATIONS

This application is a continuation of International Application No. PCT/EP2013/056401, filed Mar. 26, 2013, which claims the benefit of U.S. Provisional Patent Application No. 61/617,915, filed Mar. 30, 2012. The entire disclosures of the above-identified applications, including the specifications, drawings and claims are incorporated herein by reference in their entirety.

BACKGROUND OF THE INVENTION

1. Field of the Invention

The present invention relates to the field of video image coding and decoding. In particular, the present invention relates to encoding/decoding employing filters with variable filter parameters.

2. Description of the Related Art

At present, the majority of standardized video coding algorithms are based on hybrid video coding. Hybrid video coding methods typically combine several different lossless and lossy compression schemes in order to achieve the desired compression gain. Hybrid video coding is also the basis for ITU-T standards (H.26x standards such as H.261, H.263) as well as ISO/IEC standards (MPEG-X standards such as MPEG-1, MPEG-2, and MPEG-4). The most recent and advanced video coding standard is currently the standard denoted as H.264/MPEG-4 advanced video coding (AVC) which is a result of standardization efforts by joint video team (JVT), a joint team of ITU-T and ISO/IEC MPEG groups. This codec is being further developed by Joint Collaborative Team on Video Coding (JCT-VC) under a name High-Efficiency Video Coding (HEVC), aiming, in particular at improvements of efficiency regarding the high-resolution video coding.

A video signal input to an encoder is a sequence of images called frames, each frame being a two-dimensional matrix of pixels. All the above-mentioned standards based on hybrid video coding include subdividing each individual video frame into smaller blocks consisting of a plurality of pixels. The size of the blocks may vary, for instance, in accordance with the content of the image. The way of coding may be typically varied on a per block basis. The largest possible size for such a block, for instance in HEVC, is 64×64 pixels. It is then called the largest coding unit (LCU). In H.264/MPEG-4 AVC, a macroblock (usually denoting a block of 16×16 pixels) was the basic image element, for which the encoding is performed, with a possibility to further divide it in smaller subblocks to which some of the coding/decoding steps were applied.

Typically, the encoding steps of a hybrid video coding include a spatial and/or a temporal prediction. Accordingly, each block to be encoded is first predicted using either the blocks in its spatial neighborhood or blocks from its temporal neighborhood, i.e. from previously encoded video frames. A block of differences between the block to be encoded and its prediction, also called block of prediction residuals, is then calculated. Another encoding step is a transformation of a block of residuals from the spatial (pixel) domain into a frequency domain. The transformation aims at reducing the correlation of the input block. Further encoding step is quantization of the transform coefficients. In this step the actual lossy (irreversible) compression takes place. Usually, the compressed transform coefficient values are further compacted (losslessly compressed) by means of an entropy coding. In addition, side information necessary for reconstruction of the encoded video signal is encoded and provided together with the encoded video signal. This is for example information about the spatial and/or temporal prediction, amount of quantization, etc.

FIG. 1 is an example of a typical H.264/MPEG-4 AVC and/or HEVC video encoder 100. A subtractor 105 first determines differences e between a current block to be encoded of an input video image (input signal s) and a corresponding prediction block ŝ, which is used as a prediction of the current block to be encoded. The prediction signal may be obtained by a temporal or by a spatial prediction 180. The type of prediction can be varied on a per frame basis or on a per block basis. Blocks and/or frames predicted using temporal prediction are called "inter"-encoded and blocks and/or frames predicted using spatial prediction are called "intra"-encoded. Prediction signal using temporal prediction is derived from the previously encoded images, which are stored in a memory. The prediction signal using spatial prediction is derived from the values of boundary pixels in the neighboring blocks, which have been previously encoded, decoded, and stored in the memory. The difference e between the input signal and the prediction signal, denoted prediction error or residual, is transformed 110 resulting in coefficients, which are quantized 120. Entropy encoder 190 is then applied to the quantized coefficients in order to further reduce the amount of data to be stored and/or transmitted in a lossless way. This is mainly achieved by applying a code with code words of variable length wherein the length of a code word is chosen based on the probability of its occurrence.

Within the video encoder 100, a decoding unit is incorporated for obtaining a decoded (reconstructed) video signal s'. In compliance with the encoding steps, the decoding steps include dequantization and inverse transformation 130. The so obtained prediction error signal e' differs from the original prediction error signal due to the quantization error, called also quantization noise. A reconstructed image signal s' is then obtained by adding 140 the decoded prediction error signal e' to the prediction signal ŝ. In order to maintain the compatibility between the encoder side and the decoder side, the prediction signal ŝ is obtained based on the encoded and subsequently decoded video signal which is known at both sides the encoder and the decoder.

Due to the quantization, quantization noise is superposed to the reconstructed video signal. Due to the block-wise coding, the superposed noise often has blocking characteristics, which result, in particular for strong quantization, in visible block boundaries in the decoded image. Such blocking artifacts have a negative effect upon human visual perception. In order to reduce these artifacts, a deblocking filter 150 is applied to every reconstructed image block. The deblocking filter is applied to the reconstructed signal s'. For instance, the deblocking filter of H.264/MPEG-4 AVC has the capability of local adaptation. In the case of a high degree of blocking noise, a strong (narrow-band) low pass filter is applied, whereas for a low degree of blocking noise, a weaker (broad-band) low pass filter is applied. The strength of the low pass filter is determined by the prediction signals and by the quantized prediction error signal e'. Deblocking filter generally smoothes the block edges leading to an improved subjective quality of the decoded images. Moreover, since the filtered part of an image is used for the motion compensated prediction of further images, the filtering also reduces the prediction errors, and thus enables improvement of coding efficiency.

After a deblocking filter, a sample adaptive offset 155 and/or adaptive loop filter 160 may be applied to the image including the already deblocked signal s". Whereas the deblocking filter improves the subjective quality, Sample Adaptive Offset (SAO) and ALF aim at improving the pixel-wise fidelity ("objective" quality). In particular, SAO adds an offset in accordance with the immediate neighborhood of a pixel. The Adaptive Loop Filter (ALF) is used to compensate image distortion caused by the compression. Typically, the adaptive loop filter is a Wiener filter with filter coefficients determined such that the mean square error (MSE) between the reconstructed s' and source images s is minimized. The coefficients of ALF may be calculated and transmitted on a frame basis. ALF can be applied to the entire frame (image of the video sequence) or to local areas (blocks). An additional side information indicating which areas are to be filtered may be transmitted (block-based, frame-based or quadtree-based).

In order to be decoded, inter-encoded blocks require also storing the previously encoded and subsequently decoded portions of image(s) in the reference frame buffer 170. An inter-encoded block is predicted 180 by employing motion compensated prediction. First, a best-matching block is found for the current block within the previously encoded and decoded video frames by a motion estimator. The best-matching block then becomes a prediction signal and the relative displacement (motion) between the current block and its best match is then signalized as motion data in the form of three-dimensional motion vectors within the side information provided together with the encoded video data. The three dimensions consist of two spatial dimensions and one temporal dimension. In order to optimize the prediction accuracy, motion vectors may be determined with a spatial sub-pixel resolution e.g. half pixel or quarter pixel resolution. A motion vector with spatial sub-pixel resolution may point to a spatial position within an already decoded frame where no real pixel value is available, i.e. a sub-pixel position. Hence, spatial interpolation of such pixel values is needed in order to perform motion compensated prediction. This may be achieved by an interpolation filter (in FIG. 1 integrated within Prediction block 180).

For both, the intra- and the inter-encoding modes, the differences e between the current input signal and the prediction signal are transformed 110 and quantized 120, resulting in the quantized coefficients. Generally, an orthogonal transformation such as a two-dimensional discrete cosine transformation (DCT) or an integer version thereof is employed since it reduces the correlation of the natural video images efficiently. After the transformation, lower frequency components are usually more important for image quality then high frequency components so that more bits can be spent for coding the low frequency components than the high frequency components. In the entropy coder, the two-dimensional matrix of quantized coefficients is converted into a one-dimensional array. Typically, this conversion is performed by a so-called zig-zag scanning, which starts with the DC-coefficient in the upper left corner of the two-dimensional array and scans the two-dimensional array in a predetermined sequence ending with an AC coefficient in the lower right corner. As the energy is typically concentrated in the left upper part of the two-dimensional matrix of coefficients, corresponding to the lower frequencies, the zig-zag scanning results in an array where usually the last values are zero. This allows for efficient encoding using run-length codes as a part of/before the actual entropy coding.

The H.264/MPEG-4 H.264/MPEG-4 AVC as well as HEVC includes two functional layers, a Video Coding Layer (VCL) and a Network Abstraction Layer (NAL). The VCL provides the encoding functionality as briefly described above. The NAL encapsulates information elements into standardized units called NAL units according to their further application such as transmission over a channel or storing in storage. The information elements are, for instance, the encoded prediction error signal or other information necessary for the decoding of the video signal such as type of prediction, quantization parameter, motion vectors, etc. There are VCL NAL units containing the compressed video data and the related information, as well as non-VCL units encapsulating additional data such as parameter set relating to an entire video sequence, or a Supplemental Enhancement Information (SEI) providing additional information that can be used to improve the decoding performance.

FIG. 2 illustrates an example decoder 200 according to the H.264/MPEG-4 AVC or HEVC video coding standard. The encoded video signal (input signal to the decoder) first passes to entropy decoder 290, which decodes the quantized coefficients, the information elements necessary for decoding such as motion data, mode of prediction etc. The quantized coefficients are inversely scanned in order to obtain a two-dimensional matrix, which is then fed to inverse quantization and inverse transformation 230. After inverse quantization and inverse transformation 230, a decoded (quantized) prediction error signal e' is obtained, which corresponds to the differences obtained by subtracting the prediction signal from the signal input to the encoder in the case no quantization noise is introduced and no error occurred.

The prediction signal is obtained from either a temporal or a spatial prediction 280. The decoded information elements usually further include the information necessary for the prediction such as prediction type in the case of intra-prediction and motion data in the case of motion compensated prediction. The quantized prediction error signal in the spatial domain is then added with an adder 240 to the prediction signal obtained either from the motion compensated prediction or intra-frame prediction 280. The reconstructed image s' may be passed through a deblocking filter 250, sample adaptive offset processing 255, and an adaptive loop filter 260 and the resulting decoded signal is stored in the memory 270 to be applied for temporal or spatial prediction of the following blocks/images.

The information that is required for correct decoding and reconstruction of a video sequence is usually encoded and transmitted together with the video data in the transmitted bit stream. Information is usually allocated into video slices and different kinds of parameter sets. The particular syntax structures used and respective allocation schemes have a strong influence on coding efficiency as well as on the amount of data transmitted (network abstraction layer NAL).

Basically, there are two types of SAO and ALF filter estimation principles that are applied with standard hybrid coders, such as illustrated in FIG. 1. The first one is called frame-based filter parameter estimation (design). This means that the process of designing (optimizing) filter parameters is performed jointly for all of the pixels of a frame. In other words, in this approach a filter parameter set is designed jointly for all of the Largest Coding Units (LCU) of a frame.

The second type is called LCU-based filter parameter estimation. In this type, the process of designing filter parameters is performed one by one for each LCU in a frame. Usually, no look-ahead is allowed (as opposed to the frame-based method), meaning that the LCUs that follow the current LCU in the coding order are assumed to be unavailable to the filter design process.

Both types of filter estimation have certain advantages and drawbacks.

Frame-based filter estimation is superior to LCU-based estimation with respect to coding gain due to the joint estimation procedure. However, compared to the LCU-based approach, the frame-based approach creates additional delay in the encoder and requires additional external memory access. In view of the additional delay introduced by the frame-based approach, LCU-based ALF and SAO are more suitable for low-delay applications. In correspondence with the two different approaches to filter parameter estimation, two different syntax structures employed for encoding the filter parameter information have been developed.

A first syntax structure is called the frame-based filter parameter set syntax structure. This syntax structure is used to represent the filter parameter set that is designed for a whole frame. A frame-based syntax structure can be generated for each frame, meaning that the smallest unit is a frame. In accordance therewith, a single set of filter parameters for a filter is designed and transmitted corresponding to each frame in a sequence.

A second syntax structure is called the LCU-based filter parameter set syntax structure. The smallest syntax unit is an LCU. A parameter set syntax structure is generated for each LCU. The LCU-based syntax structure supports both frame-based filter parameter estimation and LCU-based filter parameter estimation. In accordance therewith, a filter parameter set for each filter is transmitted (signaled) for each LCU.

Further details regarding said syntax structures have been set forth in standardization documents and will be described in the detailed description section with reference to the respective standardization documents.

Both types of syntax structure have advantages and drawbacks that are closely related to the different types of filter parameter estimation schemes discussed above.

Since frame-based syntax is only applicable to frame-based filter parameter estimation, it creates an additional delay (frame-level encoding delay). Therefore, frame-based syntax is not suitable for low-delay applications such as teleconferencing. Further, the enhanced external memory access requirements in the encoder represent a drawback of frame-based syntax structures.

Therefore, the LCU-based syntax has been adopted to replace the frame-based syntax. The LCU-based syntax supports both LCU-based and frame-based filer estimation. Therefore, it is more flexible compared to frame-based parameter set syntax and can achieve lower encoding delays. However, it is a drawback of LCU-based syntax that an LCU parameter unit must be transmitted (signaled) for each LCU. Therefore, LCU-based syntax causes more parameter signaling overhead compared to the frame-based approach. Due to the higher level of signaling overhead, the LCU-based syntax causes coding loss compared to the frame-based syntax, even in the case of frame-based estimation. Since the filtering control parameters need to be signaled for each and every LCU in a frame, the size of the parameter syntax structure increases with increasing frame size and decreasing LCU size (i.e. increasing number of LCUs per frame).

SUMMARY OF THE INVENTION

The present invention aims to provide an improved coding scheme that maintains the flexibility of LCU-based filter parameter set syntax while allowing a reduced signaling overhead, and corresponding encoding and decoding methods and apparatuses.

According to a first aspect of the present invention, a video decoding method for decoding video that has been encoded by employing at least one filter with variable filter parameters is provided. The filter parameters are set for groups of Largest Coding Units. The method comprises the steps of parsing a first syntax structure for retrieving information specifying the number of said groups per picture and parsing a second syntax structure for retrieving information specifying the number of Largest Coding Units per picture. The method further comprises the step of applying a predetermined mapping function to the information retrieved from the first and the second syntax structures. Thereby, information specifying the filter parameters to be applied in decoding a particular Largest Coding Unit of the video is generated.

According to a second aspect of the present invention, a video encoding method is provided. The method employs at least one filter having variable filter parameters. The filter parameters are determined and encoded adaptively on the basis of groups of plural Largest Coding Units. The method comprises the steps of generating syntax elements specifying the number of said groups per picture and including said syntax elements into a syntax structure adapted for defining filter parameters on the basis of single Largest Coding Units in place of syntax elements specifying the number of Largest Coding Units per picture.

According to a third aspect of the present invention, a video decoding apparatus for decoding video that has been encoded by employing at least one filter with variable filter parameters is provided. The filter parameters are set for groups of Largest Coding Units. The decoding apparatus comprises at least one filter having variable filter parameters. The apparatus further comprises a first parser for parsing a first syntax structure for retrieving information specifying the number of said groups per picture and a second parser for parsing a second syntax structure for retrieving information specifying the number of Largest Coding Units per picture. Moreover, the apparatus comprises a filter information generator for applying a predetermined mapping function to the information retrieved from the first and the second syntax structures, thereby generating information specifying the filter parameters of the at least one filter to be applied in decoding a particular Largest Coding Unit of the video.

According to a fourth aspect of the present invention, a video encoding apparatus is provided. The video encoding apparatus comprises at least one filter having variable filter parameters. The filter parameters are determined and encoded adaptively on the basis of groups of plural Largest Coding Units. The apparatus further comprises a unit for generating syntax elements specifying the number of said groups per picture, and a unit for including the syntax elements into a syntax structure adapted for defining filter parameters on the basis of single Largest Coding Units in place of syntax elements specifying the number of Largest Coding Units per picture.

It is the particular approach of the present invention to determine and signal filter parameters of variable filters employed in encoding and decoding of a video on the basis of groups of Largest Coding Units (LCU). Therefore, an LCU-based syntax structure such as APS (adaptation parameter set) generally employed for signaling parameters on a single LCU basis is modified to replace redundant information about the LCU number per picture with information about the number of LCU groups per picture. A mapping function determines, how the LCUs of a frame are grouped. At the decoder side, the mapping function is applied, in order to determine to which LCU group a particular LCU belongs, based on information about the number of LCUs and the number LCU groups encoded in different syntax structures such as APS and SPS (Sequence Parameter Set). Thereby, the advantages of LCU-based signaling syntax are preserved, while the size of the signaling overhead is reduced.

BRIEF DESCRIPTION OF THE DRAWINGS

The accompanying drawings are incorporated into and form a part of a specification to illustrate several embodiments of the present invention. These drawings, together with the description, serve to explain the principles of the invention. The drawings are only for the purpose of illustrating preferred and alternative examples of how the invention can be made and used, and are not to be construed as limiting the invention to only the illustrated and described embodiments. Further features and advantages will become apparent from the following and more particular description of the various embodiments of the invention, as illustrated in the accompanying drawings, in which like reference numbers refer to like elements and wherein:

FIG. 3 provides a general example for employing LCU-based parameter syntax for Adaptive Loop Filter (ALF) and Sample Adaptive Offset (SAO);

FIG. 4 illustrates RBSP (Rule Byte Sequence Payload) syntax within an adaptation parameter set;

FIG. 5 provides an illustration of sample adaptive offset parameter syntax;

FIG. 6 provides an illustration of adaptive loop filter parameter syntax;

FIG. 7 provides an illustration of additional syntax elements introduced within the framework of APS in accordance with the present invention;

FIG. 9 illustrates an example of sample adaptive offset parameter syntax in accordance with an embodiment of the present invention;

FIG. 13 illustrates a result of generating LCU groups in accordance with a first exemplary mapping function of the present invention;

FIG. 14 illustrates a result of generating LCU groups in accordance with a second exemplary mapping function of the present invention;

FIG. 22 illustrates a structure of multiplexed data.

FIG. 33 shows an example of a look-up table in which video data standards are associated with driving frequencies.

DETAILED DESCRIPTION OF THE INVENTION

Figure 1:
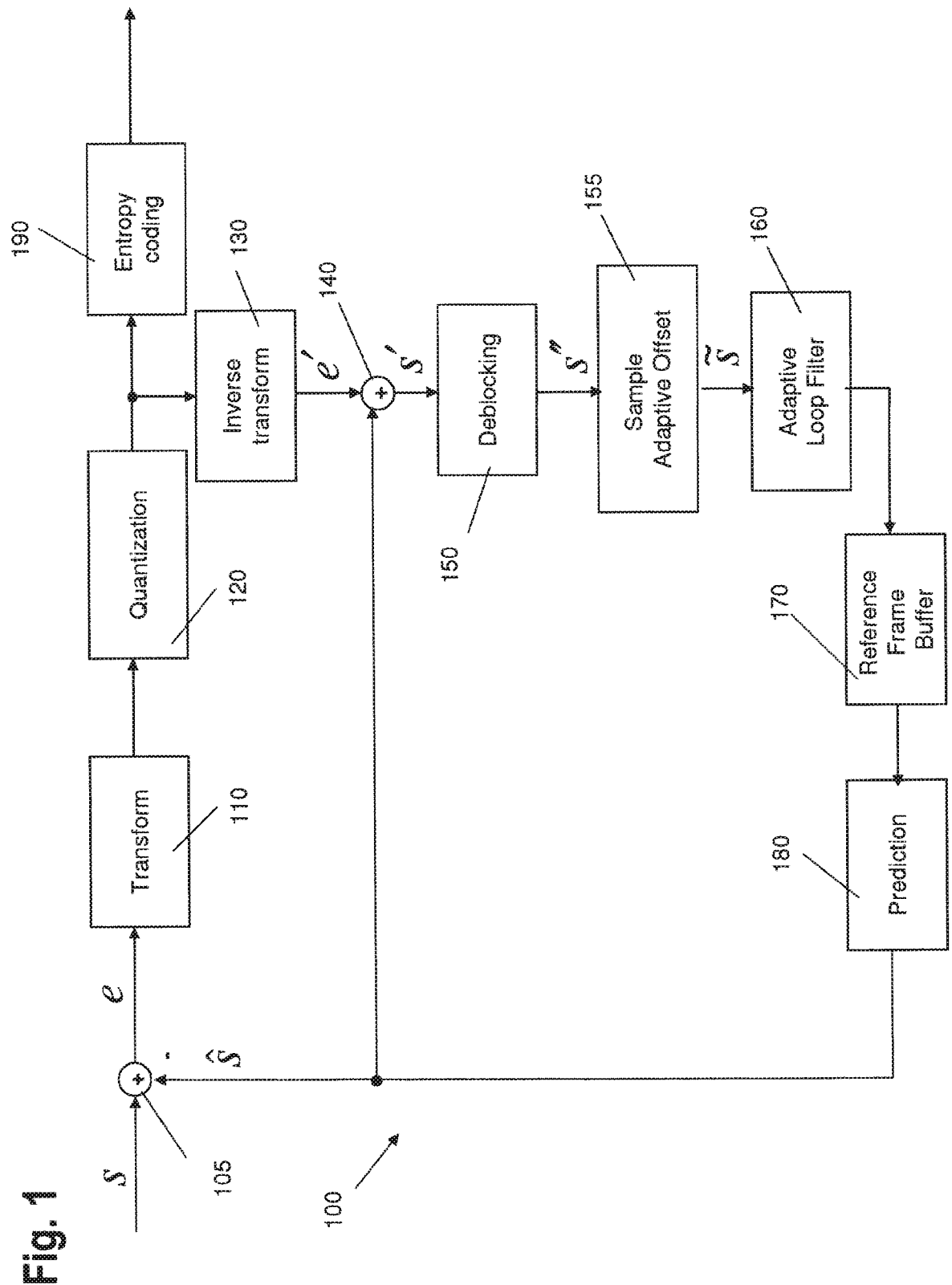
FIG. 1 is a block diagram illustrating an example of a video encoder.

State of the art hybrid video coders such as those illustrated in FIG. 1 apply in-loop Deblocking Filter (DF), Sample Adaptive Offset (SAO) and Adaptive Loop Filter (ALF) processing stages before the reconstructed frame is displayed on the screen or stored at the reference frame buffer. These processes are essentially filtering stages that improve the objective and/or subjective quality of the frame before displaying on the screen. The DF improves the subjective quality, whereas SAO and ALF improve both subjective and objective qualities. The control parameters associated with SAO and ALF processes are signaled in the bit stream. More specifically, since the operation of the SAO and ALF filters has an adaptive nature, control parameters are transmitted in the bit stream so that the decoder can successfully decode the video data. Control parameters for ALF may include, for instance, a flag indicating whether the ALF is applied on a picture slice or not, filter shape, filter coefficients, etc. Corresponding information may be included by the SAO parameters.

ALF and SAO control parameters are usually signaled within the Network Abstraction Layer (NAL). In order to group at least some of these data, they may be included within a parameter set called Adaptation Parameter Set (APS). Alternatively, filter parameter signaling is possible inside a picture slice.

Further details regarding filter control parameters and respective syntax conventions have been defined in the following prior art references (standard documents) that are hereby incorporated by reference in their entirety:

[1] JCTVC-F056 version 5, "Sample Adaptive Offset with LCU-based Syntax", Torino, July, 2011
[2] JCTVC-G498 version 3, "CE8: ALF with low latency and reduced complexity", Geneva, November, 2011
[3] JCTVC-H1003 version 21, "WD4: Working Draft 6 of High-Efficiency Video Coding", San Jose, February, 2012
[4] JCTVC-G1103 version 10, "WD5: Working Draft 5 of High-Efficiency Video Coding", Geneva, November 2011

As briefly introduced above, frame-based parameter syntax and LCU-based parameter syntax for ALF and SAO are generally distinguished.

Frame-based parameter syntax is described in prior art document [4].

A general example for a frame-based parameter syntax structure is given below (for the case of ALF):

```
ALF_parameter set
{
no_filters_per_frame;
for (i=0; i<no_filters_per_frame ; i++)
   filter_coefficients( );
frame_partition_info( ); //how the transmitted filters are matched to
each region in a frame
}
```

The parameter "frame_partition_info( )" in the last line of said example relates to the "quadtree" partitioning of a frame into four, or moreover, sixteen partitions.

In accordance with frame-based parameter syntax, one ALF_parameter_set is designed and transmitted corresponding to each frame in a sequence.

The general structure of the frame-based parameter syntax structure for SAO corresponds to the illustrated one for ALF. An exemplary illustration thereof has therefore been omitted.

There are the following problems in the framework of frame-based parameter set syntax:

Frame-based filter parameter set syntax structure causes frame level encoding delay in the encoder. Usually, a frame can be divided into multiple slices in order to reduce the delay between encoding and decoding (sub-picture level delay). However, when ALF and SAO are turned on, sub-picture level delay cannot be achieved due to frame-based filter parameter estimation.

Moreover, frame-based filter parameter estimation increases the memory access requirements in the encoder. The frame-based filter estimation process can be summarized in three steps:
1. Read a whole frame from memory in order to compute statistical information for the frame (correlation matrices etc.)
2. Compute filter coefficients and decide on frame partitioning
3. Read a whole frame in order to apply the computed filters on the frame.

Accordingly, the frame-based filter estimation requires two whole frame accesses in order to design and apply a filter. It has to be noted that external memory access bandwidth is generally a very limited resource.

The details of the LCU-based parameter syntax structures of ALF and SAO can be found in prior art document [3]. Further details with respect to LCU-based SAO are found in standard document JCTVC-H273, and further details regarding LCU-based ALF and SAO can be found in standard document JCTVC-H274_r2.

A general example for LCU-based parameter syntax structure is shown below:

```
for (i=0; i<num_LCUs_in_frame; i++)
{
ALF_parameter_LCU_unit( );
}
ALF_parameter_LCU_unit( )
{
ALF_on/off_flag; //filtering is applied in the current LCU or not.
   if (ALF_on/off_flag == 1)
      ALF_new_filter_flag; //A new filter is generated or a filter that
   is generated in a previous LCU is used.
      if (ALF_new_filter_flag)
         filter_coefficients ( );
      else
         use_filter_from_left_or_up_LCU_flag; //Use the filter from left
   LCU or upper LCU.
}
```

In accordance therewith (cf. the for-loop), a filter parameter unit is signaled for each LCU.

The LCU-based filter estimation process can be summarized in the following three steps:
1. Read LCU from memory. Compute statistical information.
2. According to a rate-distortion measure, decide on whether to generate a new filter or to use an old filter that has been generated in a previous LCU (previous in the coding order).
3. Apply the generated or re-used filter on the LCU.

FIG. 3 provides an illustration of an LCU-based syntax example for the case of SAO (cf. prior art reference [1]). "SAOP" in the drawing means SAO Parameter Unit. Thus, FIG. 3 illustrates four parameter units, SAOP1 to SAOP4. For instance, in the case of SAO parameter unit 1, the SAO parameters are generated in the first LCU and the same filter parameters are applied on the first three LCUs in the same LCU row. In the second and third LCUs in the row only one flag is needed to be signaled indicating that the same filter coefficients that are applied to left LCU are applied to the current LCU. In a similar manner, the parameters of SAO parameter unit 2 (SAOP2) are, for instance, employed for the last two parameter units in the first line, and the two parameter units below. In this example last two LCUs in the second LCU row signal a flag indicating that the SAO filter coefficients are inherited from the upper LCU. As compared to LCU-based filter estimation, frame-based parameter estimation causes increased encoding delay and external memory access. However, it is a more precise filter estimation method and results in a better coding efficiency in subjective quality.

LCU-based parameter set estimation can be applied on the fly. Generally, the encoders operate on an LCU-basis, and therefore LCU-based filter estimation does not cost additional external memory access or additional encoding delay. However, the coding efficiency is inferior, since parameter estimation is not good (most of the LCUs re-use previously generated filters in order to reduce overhead).

Frame-based parameter syntax only allows frame-based filter estimation. However, LCU-based syntax allows both LCU- and frame-based estimation.

When frame-based filter estimation is used, the filter parameters can be represented by either LCU-based syntax structure or frame-based syntax structure. The coding efficiency of the frame-based representation is higher than that of LCU-based syntax, since LCU-based syntax incurs more overhead.

In the decoder, the filter application process is always the same, independent from the syntax structure or the filter estimation process. Therefore, before the actual decoding, on the decoder side, parsing of received syntax structures has to be performed in order to retrieve the information about which filter parameters are to be applied for which of the LCUs.

The LCU-based parameter syntax of ALF and SAO can be placed (signaled) either in the adaptation parameter set (APS) or inside a slice.

For low delay applications, the filter parameters are signaled inside a slice. As a result, sub-picture level delay can be achieved by employing LCU-based filter estimation.

For non-low delay applications, the filter parameters might be signaled inside the APS. In this case, frame-based filter estimation can be applied, resulting in a superior coding efficiency.

FIGS. 4, 5, and 6 illustrate the state of the art syntax structure for APS, LCU-based SAO parameter set syntax, and LCU-based ALF parameter set syntax.

FIG. 4 illustrates a table 400 comprising code lines which define at least a part of the content of an APS element, called RBSP (Raw Byte Sequence Payload). Specifically, code lines 401 to 405 contain information relating to the SAO parameters, while code lines 406 to 408 contain information relating to the ALF parameters. More specifically, code line 405 comprises the syntax element aps_sao_param( ) which may be coded with a CABAL encoding. Similarly, code line 408 comprises the syntax element alf_param( ) which may also be coded with a VLC (Variable Length Code) or CABAC (Context Adapted Binary Arithmetic Coding) encoding. Accordingly, a single APS as defined by table 400 may carry information relating to both ALF parameters and SAO parameters.

In the right hand column of table 400, descriptors indicate the type of coding which may be used for each of the syntax elements on the left side of the table. The meaning of the descriptors to which reference is made is defined in prior art documents [3] and [4]. The parsing process for the respective descriptors is specified in section 9 of both references [3] and [4].

In particular, the descriptors employed in FIG. 4 have the following meaning: ue(v) unsigned integer Exp-Golomb-coded syntax element with the left bit first; u(n):unsigned integer using n bits. The parsing process for this descriptor is specified by the return value of the function read_bits(n) interpreted as a binary representation of an unsigned integer with the most significant bit written first; se(v):signed integer Exp-Golomb-coded syntax element with the left bit first.

FIG. 5 illustrates a table 500 comprising at least part of the syntax elements of the sample adaptive offset parameter syntax structure, i.e. the function aps_sao_param( ) shown in line 405 of FIG. 4.

The parameters shown in lines 501 and 502 of the table of FIG. 5 are present in the parameter syntax structure if SAO parameters are signaled in the APS: sao_num_lcu_in_width_ minus1 (501) and sao_num_lcu_in_height_ minus1 (502). The value of (sao_num_lcu_in_width_minus1+1) specifies the number of coding tree blocks in picture widths. Parameter value (sao_num_lcu_in_height_ minus1+1) specifies the number of coding tree blocks in picture height. As can be further seen from the syntax of FIG. 5, these two parameter values specify the extent of two for-loops as defined in lines 503 and 504 of FIG. 5. In accordance therewith, the amount of parameter units sao_unit_vlc( ) to be signaled for each LCU and including LCU-specific SAO filter and control parameters, illustrated in lines 505, 506, and 507 of FIG. 5, is thereby defined.

In a similar manner, FIG. 6 illustrates a table 600 comprising at least part of the syntax elements of an adaptive loop filter parameter syntax structure, i.e. corresponding to the function alf_param( ) of line 408 of FIG. 4. Specifically, lines 601 and 602 include parameters alf_num_lcu_in_width_minus1 and alf_num_lcu_in_height_minus1. The value (alf_num_lcu_in_width_minus1+1) specifies the number of coding tree blocks of picture width. Variable numCtbInWidth is set to said value, if it present. If, otherwise, alf_num_lcu_in_width_minus1 is not present, numCtbInWidth is set to PicWidthInCtbs.

Parameter value (alf_num_lcu_in_height_minus1+1) specifies the number of coding tree blocks of picture height. If the latter syntax element is present, numCtbInHeight is set equal to (alf_num_lcu_in_height_minus1+1). Otherwise, if alf_num_lcu_in_height_minus1 is not present, numCtbInHeight is set equal to PicHeightInCtbs.

The latter syntax elements are present in the parameter syntax structure, if ALF parameters are signaled in the APS. As can be seen from the for-loop initiated at line 604 of FIG. 6, they define the number of parameter units alf_unit( ) which are in accordance with the state of the art LCU-based ALF syntax are signaled for each LCU, and include LCU-specific ALF filter and control parameters.

As shown in the foregoing FIGS. 5 and 6, the number of the LCU-specific parameter units sao_unit_vlc( ) and alf_unit( ) can be derived based on the syntax elements (sao_num_lcu_in_width_minus1, sao_num_lcu_in_height_ minus1) and (alf_num_lcu_in_width_minus1, alf_num_lcu_in_height_minus1), respectively.

Therefore, the latter syntax elements have to be signalled in order guarantee independent parsing of the APS, although in the state of the art syntax structures they basically represent duplicate information since they are also signalled in the SPS. Namely, it has to be noted that an APS does not have any reference to a Sequence Parameter Set (SPS, including information on width, height and number of coding units of a frame), or to a Picture Parameter Set (PPS). Therefore, the width and height of the coded picture or the LCU is not known in the APS. As a result, in order to be able to parse an APS independent of an SPS or PPS, the four syntax elements shown in lines 501, 502 and 601, 602 of FIGS. 5 and 6, respectively, need to be signalled in the APS, although it is a duplication of information.

As summarized above, the LCU-based syntax, although superior to frame-based syntax with respect to encoding delay and external memory access requirements in the encoder, has the drawback of an increased overhead since an LCU parameter unit is signalled for each LCU. This becomes particularly evident with increasing frame size and/or decreasing LCU size.

For example, if the LCU size is small (usual LCU size 64×64 pixels [luma samples], minimum supported size 16×16 pixels), the overhead of the LCU-based filter parameter syntax would be quite high. As a result, SAO and ALF would perform very poorly.

It is therefore desirable to amend the employed syntax structures in such a manner that the signalling overhead is reduced, while maintaining the advantages of LCU-based syntax as far as possible.

As a straightforward solution, one might consider using LCU-based syntax only when parameters are signalled inside the slice (i.e. for low-delay applications), while employing frame-based syntax when parameters are signalled in the APS. As a result, the overhead can be reduced in the case of frame-based filter parameter estimation, when filter parameters are placed in the APS.

However, such a rather straightforward approach would create a new problem: if two different syntax structures are used within the same bit stream, two different circuitries would have to be implemented in the decoder unit, thereby increasing the number of logic gates, i.e. the hardware effort, and as a result, the overall cost.

In view of the above, it is therefore further desirable to reduce the signalling overhead of LCU-based filter parameter signalling, in the particular case of signalling within the APS (Adaptation Parameter Set). Such a solution is achieved by the present invention. Hence, although LCU-based parameter syntax structures can generally be placed within APS, as well as within a picture slice, the present invention deals specifically with the former case, i.e. a structure wherein the filter parameters are signalled within the APS.

If the ALF and SAO parameters are signalled within the picture slice, the control parameters and filter coefficients are coded with CABAL entropy coding method. Since the CABAL has a context adaptive nature it can effectively reduce the redundancy that is introduced by the LCU-based syntax.

However inside the APS the filter parameters are coded with Variable Length Coding. In this coding method the syntax elements of the LCU-based syntax structure are coded with variable length codes independently (not jointly as in the case of CABAL coding). Therefore although the filter control parameters of neighbouring LCUs are similar, this redundancy cannot be exploited when parameters are coded inside an APS.

The basic idea underlying the solution according to the present invention is to reduce the above described redundancy (duplication) of information, but rather increase the information content of the existing syntax elements of the LCU-based syntax structure.

In order to achieve said goal, filter parameter syntax units of the LCU-based syntax structure are adaptively grouped together in order to reduce overhead. Thereby, the LCU-based syntax representation is not changed, but the effective region of the filter parameter syntax units is adaptively adjusted to be a group of LCUs (instead of a single LCU in the state of the art). The region sizes are adaptively selected. This can be done, for instance, based on a rate-distortion measure.

First of all, in order to represent the adaptive grouping information, additional syntax elements would be required. However, in accordance with the present invention further considerations have been made to exploit the redundancies in the existing syntax elements. As a result, no additional syntax elements are required to be signalled, but the information content of the existing syntax elements is increased.

FIG. 7 illustrates an example of an excerpt of a table 500' with additional syntax elements in accordance with the basic idea underlying the present invention as outlined above. More specifically, table 500' relates to the function aps_sao_param( ) 405, the conventional syntax of which has been illustrated by means of table 500 in FIG. 5.

Table 500' of FIG. 7 differs from table 500 of FIG. 5 in that inside the syntax structure of the SAO parameter set, besides syntax elements 501 and 502, two new syntax elements are signalled in lines 701 and 702. Syntax element 701, labelled vertical_lcu_grouping_minus1 represents the number of LCUs that are grouped together in the vertical direction. Syntax element 702, labelled horizontal_lcu_grouping_minus1 represents the number of LCUs that are grouped together in the horizontal direction.

With the modification illustrated in FIG. 7, the following can be achieved: while according to the state of the art syntax structure (FIG. 5) one parameter unit has to be signalled for each LCU, with the modification of FIG. 7 LCUs can be grouped together and one parameter unit must be signalled only for each LCU unit. As result, the signalling overhead is reduced.

The approach of the present invention is especially useful in the case of frame-based encoding. It has to be noted that the parsing of the syntax structure aps_sao_param( ) 405 is the same as in the conventional approach. Therefore, in contrast to the "straightforward solution" mentioned above, no additional (second) parsing circuitry is required at the decoder side.

Although FIG. 7 illustrates the modified syntax structure for the case of Sample Adaptive Offset parameter syntax, this has been done by way of example only, and a person skilled in the art is aware that respective modifications apply to the syntax structures for encoding and transmitting filter parameters for other kinds of filters, and in particular for the Adaptive Loop Filter (ALF) parameter syntax.

Figure 8:
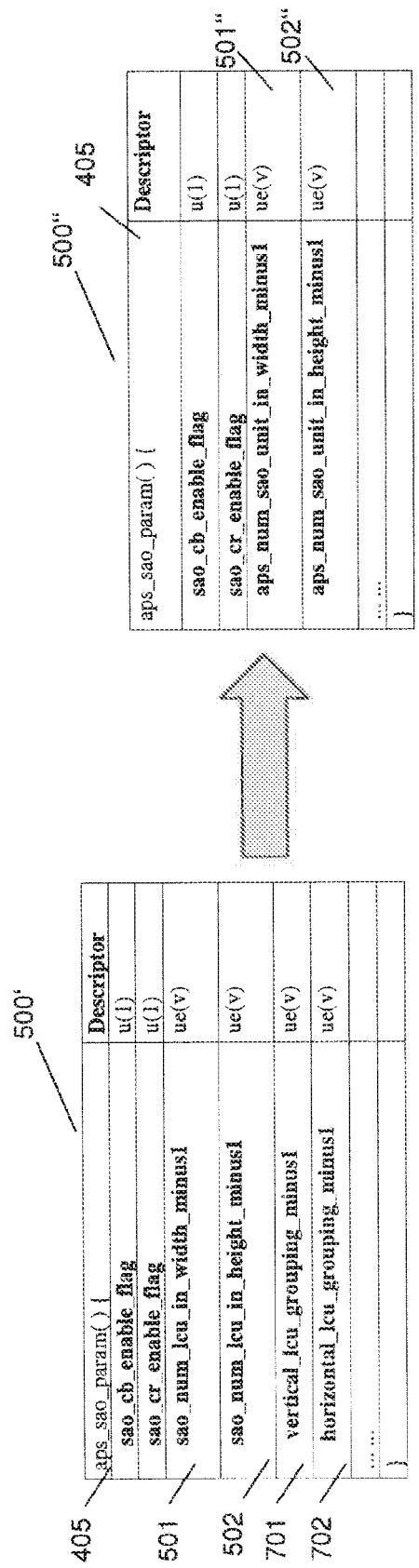
FIG. 8 illustrates the adaptation of APS syntax parameters in accordance with an embodiment of the present invention.

FIG. 8 illustrates a second step of consideration to be performed for generating a syntactic structure in accordance with the present invention, namely wherein the number of syntax elements is reduced back to the number of syntax elements in conventional LCU-based signalling, while, however, the information content is changed to reduce redundancy and employ the available parameters more efficiently to reduce overhead. More specifically, in accordance with the present invention (as once more exemplified by means of SAO parameters), two new syntax elements are derived based on the state of the art syntax elements 501 and 502 and the newly introduced syntax elements 701 and 702 shown in FIG. 7.

The left hand side of FIG. 8 illustrates once more a part of syntax table 500' of FIG. 7. As explained above, the syntax elements sao_num_lcu_in_width_minus1 (501) and sao_num_lcu_in_height_minus1 (502) are signaled inside the function aps_sao_param( ) 405 for the purpose of independent parsing of the APS. These syntax elements are used to compute the number of SAO parameter units in the aps_sao_param( ). As explained above with reference to FIG. 5, the two syntax elements 501 and 502 are used to deduce the number of parameter units sao_unit_vlc( ) in the APS.

In the framework of the present invention, syntax elements 501 and 502 are combined with newly introduced syntax elements 701 and 702 defining LCU grouping to result in two new syntax elements in the lines labeled 501" and 502" of the further modified table 500" shown on the right hand side of FIG. 8. Namely, syntax element 501 and 701 on the one hand, and 502 and 702, on the other hand, are combined into single syntax elements 501″ and 502″, respectively in accordance with the relations:

aps_num_sao_unit_in_width_minus1=function(sa-
      o_num_lcu_in_width_minus1,horizontal_lcu_
      grouping_minus1)

aps_num_sao_unit_in_height_minus1=function(sa-
      o_num_lcu_in_height_minus1,vertical_lcu_
      grouping_minus1).

The two resulting parameters 501″ and 502″ provide all necessary information to correctly parse the bit stream at the decoder side. The function which is only generally indicated in the above relations may be, for example, division of parameters followed by any of the standard functions round ( ), ceil( ), floor( ) as defined, for instance in prior art reference [3].

In accordance therewith, ceil(x) is the smallest integer greater than or equal to x; floor(x) is the greatest integer less than or equal to x; and round(x)=sign(x)*floor(abs(x)+0.5).

However, the function is not limited to the above described examples, and a custom defined function or function that is indicated or signalled inside the bit stream is also applicable within the framework of the present invention.

The meaning of the combined parameters 501″ and 502″ is as follows:

(aps_num_sao_unit_in_width_minus1+1) specifies the number of Sample Adaptive Offset units in picture width. (aps_num_sao_unit_in_height_minus1+1) specifies the number of Sample Adaptive Offset units in picture height. In accordance with the present invention, syntax elements 501″ and 502″ replace conventional syntax elements 501 and 502. In other words, a new use is given for the syntax elements provided in the respective place of the function aps_sao_param( ) 405. While the syntax elements sao_num_lcu_in_width_minus1 (501) and sao_num_lcu_in_height_minus1 (502) which are required for parsing of the APS basically provide duplicate information in the bit stream, respective new syntax elements 501″ and 502″ are not redundant anymore.

More generally, new syntax elements 501″ and 502″ specify the number of LCU groups (filter parameter signalling units) in the direction of picture width (frame width) and in the direction of picture height (frame height), respectively. They are generated based on syntax elements (501 and 502) specifying the number of LCUs per picture (in width and height direction, respectively) and syntax elements (701 and 702) specifying the number of LCUs that are grouped together (in vertical and horizontal direction, respectively). More specifically, syntax elements 501″ and 502″ are generated by applying a predetermined function on syntax elements 501, 502, 701 and 702.

Based on the number of LCU groups and the number of LCUs per picture (frame), a mapping function is applied to determine which LCUs of the frame exactly are grouped together, thereby determining the correct filter parameters for each single LCU. The mapping function may be a standard or customized function, which may be preset on the decoder side for proper parsing. Alternatively, information specifying the predetermined function may be encoded in the bitstream for being transmitted to the decoder side. At the decoder side, the mapping function is applied to determine which of the filter parameters to apply to a particular LCU, by determining the LCU group to which it belongs. Further details regarding the mapping function are described below.

As indicated above, although the detailed illustration is provided herein with respect to function aps_sao_param( ) 405, a person skilled in the art is aware on how to modify respective structures for other kinds of filter parameters. In particular, for the function alf_param( ) 408 illustrated for the conventional case in FIG. 6, parameters 601 and 602 combine with the new information contained in parameters 701 and 702 to form new syntax elements aps_num_alf_unit_in_width_minus1 and aps_num_alf_unit_in_height_minus1. Herein, the value (aps_num_alf_unit_in_width_minus1+1) specifies the number of Adaptive Loop Filter units in picture width. If the parameter is present, the variable numCtbInWidth is set to (aps_num_alf_unit_in_width_minus1+1). Otherwise, if the parameter aps_num_alf_unit_in_width_minus1 is not present, numCtbInWidth is set to PicWidthInCtbs. The parameter value (aps_num_alf_unit_in_height_minus1+1) specifies the number of adaptive loop filter units and picture height. The variable numCtbInHeight is set to (aps_num_alf_unit_in_height_minus1+1), if aps_num_alf_unit_in_height_minus1 is present. Otherwise, numCtbInHeight is set to PicHeightInCtbs.

A more complete illustration of modified table 500″ illustrating sample adaptive offset parameter syntax in accordance with the present invention, by way of example, is shown in FIG. 9. As can be seen from FIG. 9, function aps_sao_param( ) 405 has been modified by replacing lines 501 and 502 of the corresponding state of the art syntax illustrated in FIG. 5 with lines 501″ and 502″ that have been explained above with reference to FIG. 8. As a consequence, lines 503 and 504 of FIG. 5 defining the two for-loops within which the parameter units are defined have been modified to lines 503″ and 504″. In the latter lines, as can be seen from FIG. 9, the parameters (sao_num_lcu_in_height(width)_minus1+1) have been replaced by the parameters (aps_num_sao_unit_in_height(width)_minus1+1) in the definition of the for-loops. As a consequence, the number of parameter units sao_unit_vlc( ) in lines 506, 507, and 508 is now defined by the newly introduced parameters specifying the number of SAO units, i.e. LCU groups.

As can be seen from the above, the present invention breaks the one-to-one mapping of filter parameter units to LCUs, in view of the LCU grouping. Since, moreover, the structure of the present invention, without employing extra syntax elements, does not signal LCU grouping information explicitly, the LCU grouping information (in the illustrated examples: for instance in the vertical and horizontal direction) has to be inferred on the decoder side, in order to apply SAO and ALF correctly on a picture slice.

Figure 2:
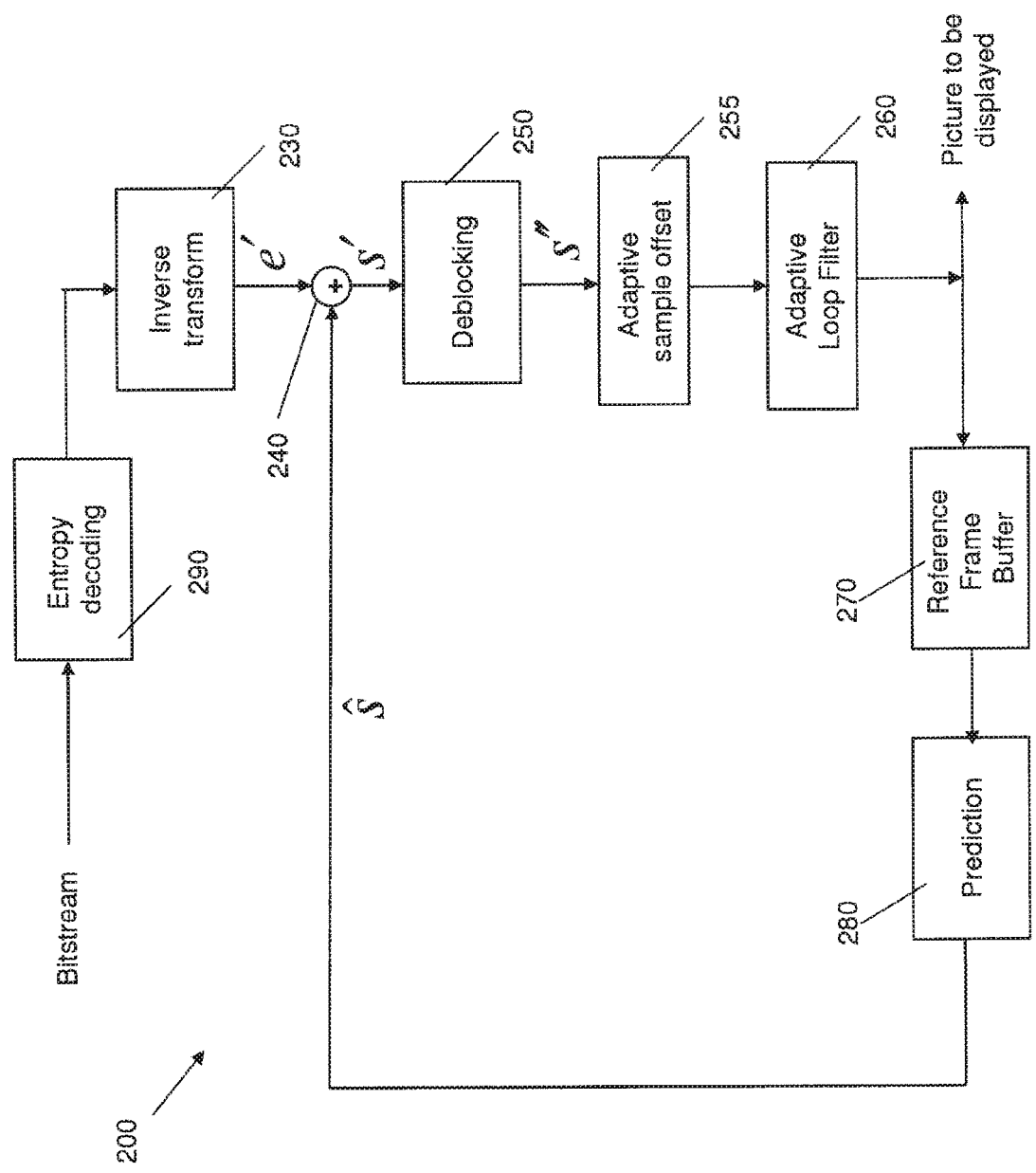
FIG. 2 is a block diagram illustrating an example of a video decoder.

In other words: in the decoder, information has to be generated specifying "which filter parameter set is applied to which LOU", in order to correctly apply filtering in the decoding processing of FIG. 2. Therefore, a mapping rule is necessary, which is provided by the mapping function mentioned above.

Figure 10:
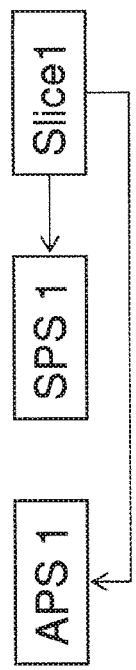
FIG. 10 provides an illustration of reference relationship within a transmitted encoded bit stream in accordance with an embodiment of the present invention.

As a consequence, the bit stream must be parsed at the decoder side, before the actual decoding can be performed. Therefore, the slice header has reference to an SPS and an APS. This is illustrated in FIG. 10.

As described above, in the APS, the number of SAO parameter units per frame in picture width and height is available. Moreover, in the SPS, the number of LCUs in picture width and height is available, which is no longer present in the APS as modified in accordance with the present invention. As a consequence, as soon as a slice header is available for parsing, the number of LCUs per frame is known, and the mapping of the parameters to the individual LCUs in a slice can be computed whenever a slice is available.

More generally, the picture slice header is a third syntax structure including references to a first syntax structure (APS) and a second syntax structure (SPS). From the first syntax structure, information specifying the number of LCU groups (in a picture width and height direction) can be retrieved. From the second syntax structure, information specifying the number of LCUs can be retrieved.

Figure 11:
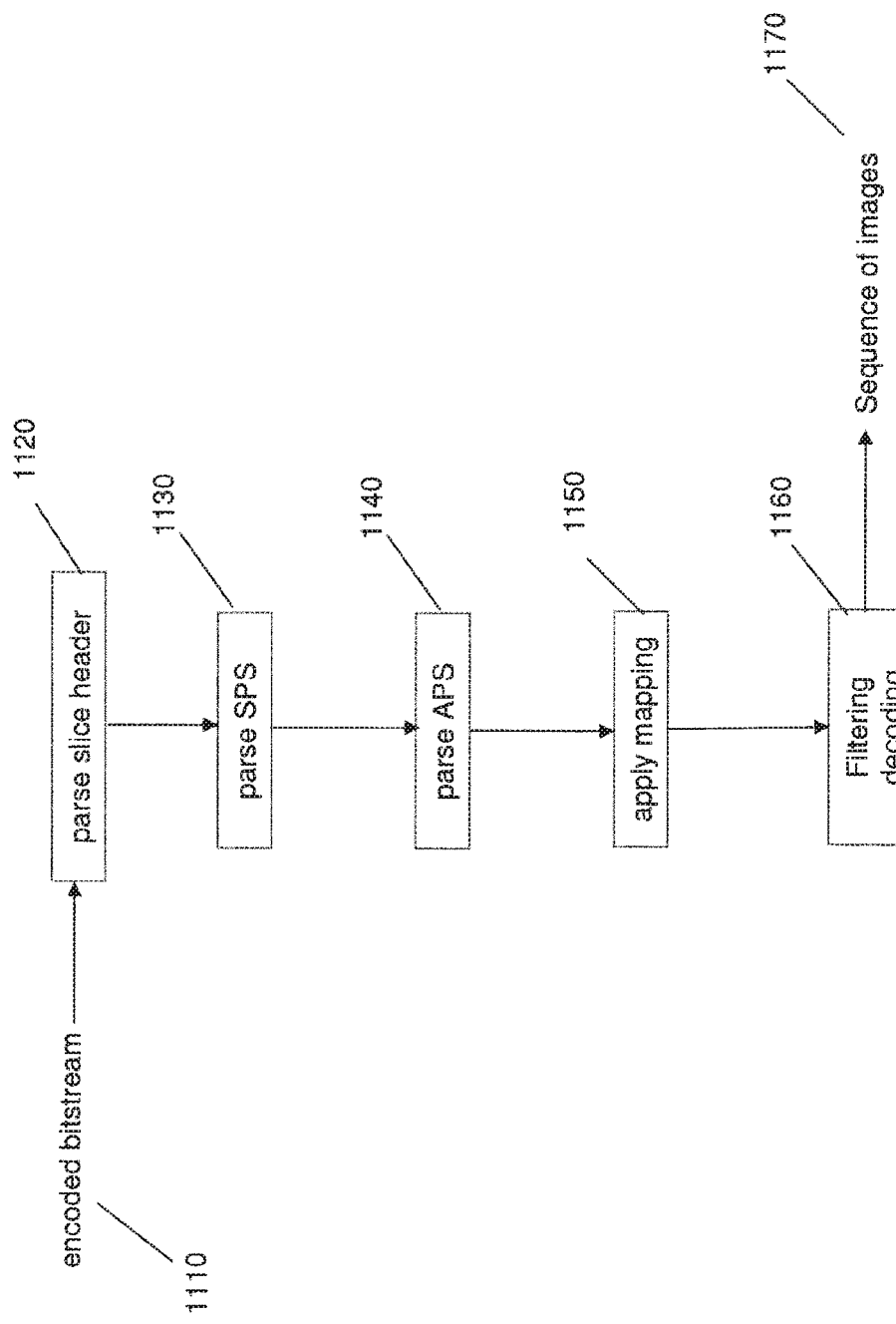
FIG. 11 is a flow diagram illustrating coding processing in accordance with an embodiment of the present invention.

A flow chart illustrating the decoder side processing in accordance with the present invention is shown in FIG. 11.

In the first step 1120, a picture slice header identified in the encoded bit stream 1110 is parsed. As indicated above, the slice header has references to an SPS and an APS. (Further, the slice header also refers to a picture parameter set PPS, which is, however, not essential for the present invention).

Firstly, the slice header refers to the SPS. As a result of parsing the SPS referred to in step 1130, the width and height of the frame and the LCU are known in the slice. As a consequence, the number of LCUs per frame can be determined.

Secondly, the slice header refers to the APS. As a result of parsing APS in step 1140, the number of filter units per width and height are known in the slice.

As a consequence, after performing steps 1130 and 1140, the filter parameters in the APS can be mapped to each LCU in the slice, which is performed in subsequent step 1150 of FIG. 11. In other words, the necessary information to infer which filter parameter set is to be applied to which LCU is available, although the present invention applies signalling on APS level only, but not on the slice level.

Generally speaking, the mapping function is applied in step 1150, in the decoder. The mapping function uses the following information: aps_num_alf_unit_in_height_minus1 and aps_num_alf_unit_in_width_minus1 (from APS, in the present case exemplified for ALF, applicable in an analog manner to SAO); frame height, frame width, LCU height and LCU width from SPS. The mapping function provides the information specifying which filter parameter set is applied to which LCU.

Generally, the mapping function determines the filter parameters that are used in the LCU as a function of the arguments lcu_x and lcu_y (specifying the coordinates of the current LCU), aps_num_alf_unit_in_height_minus1, aps_num_alf_unit_in_width_minus1, frame height, frame width, LCU height, LCU width:

(Filter parameters that are used in the LCU)=function(lcu_x,lcu_y,aps_num_alf_unit_in_height_minus1,aps_num_alf_unit_in_width_minus1, frame height, frame width, LCU height, LCU width).

The function itself may be, for instance, one of functions round( ), ceil( ), floor( ) as defined in prior art document [3]. Also, any custom defined function that has been preset in the decoder in advance is possible. Alternatively, the function may be indicated or signalled explicitly inside the bit stream.

In other words, the present invention provides a virtual image plane for filter parameter sets. In set 1150 of FIG. 11, the virtual filter plane is mapped to the actual coded picture. Only after step 1150, the actual decoding of the pictures included in the bit stream, including filter application, is possible to be performed in subsequent step 1160. As a result, sequence of images 1170 is available on the decoder side.

In the following, two different mapping functions that have been developed in the present invention, are explained in detail with reference to FIGS. 12, 13 and 14. The exemplary mapping functions given herein by way of example for the case of SAO are mutatis mutandis applicable to other filter variable filter parameters, and in particular to ALF. The mapping functions are employed both for LCU grouping (partitioning a LCU frame into groups) at the encoder side as well as for allocating the correct filter parameters to the LCU units on the decoder side.

In accordance with a first example of a mapping function, the following two rules are applied:
1. Partition a frame into equally spaced regions where the region height and the region width are given by region height=frame height/(aps_num_sao_unit_in_height_minus1+1)

region width=frame width/(aps_num_sao_unit_in_width_minus1+1)

2. Determine the center point for each LCU. An LCU is assigned to a region if its center point lies inside that region.

Each of said regions corresponds to one of the LCU groups of the present invention, so that the number of SAO parameter units that are signalled in the APS is equal to the number of regions.

Figure 12:
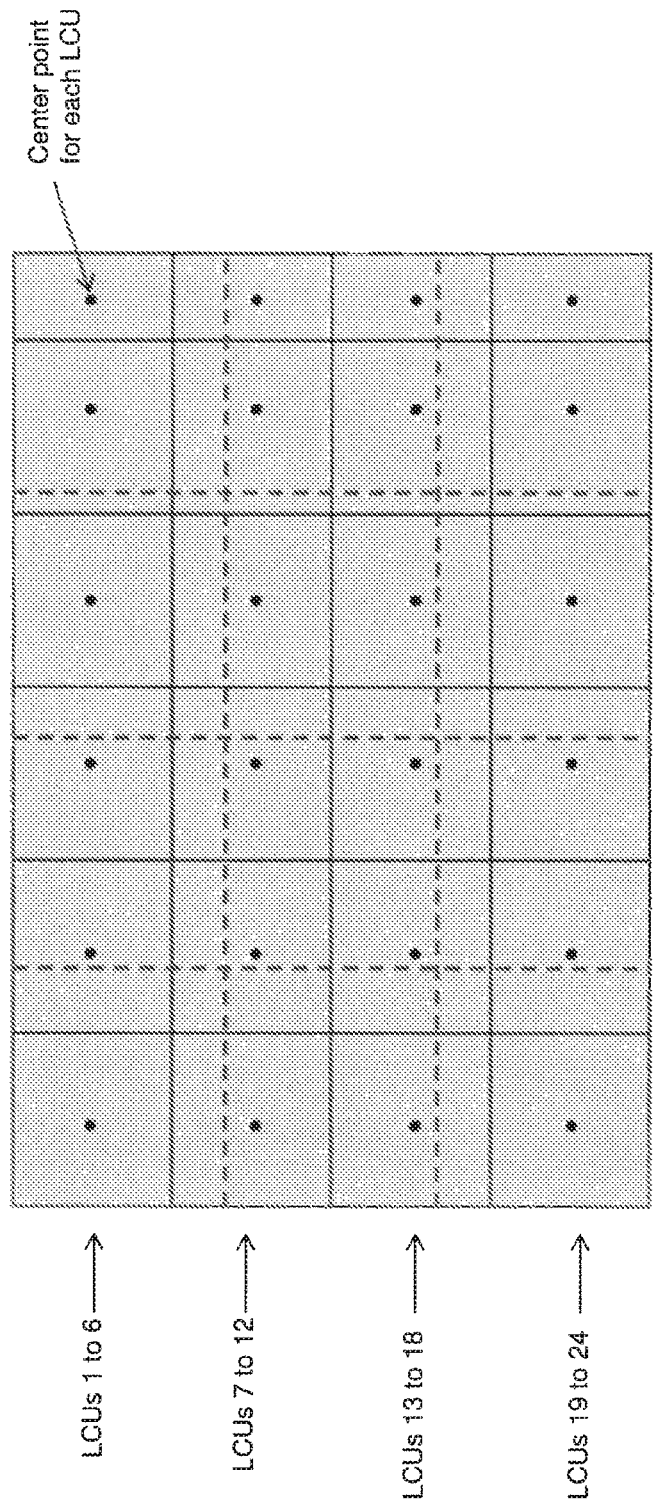
FIG. 12 illustrates a process of partitioning a frame into LCUs and regions for signaling filter parameters in accordance with an embodiment of the present invention.

LCU grouping in accordance with the above described rules 1 and 2 is illustrated in an exemplary manner in FIG. 12. In the figure, by way of example, a frame with a height of 256 luma samples (or chroma samples) and a width of 352 luma samples (or chroma samples) is illustrated. The LCU height and LCU width is 64 luma samples each. As a consequence, there are twenty four LCUs, which are arranged in four lines. The LCU boundaries are indicated by full horizontal and vertical lines. It has to be noted that the rightmost LCU of each line does not form a complete LCU, since the frame width of 352 is no integer multiple of the LCU width of 64. Actually, there are 5.5 LCU widths per line. A black full dot in each LCU in FIG. 12 indicates the center point for the respective LCU.

Moreover, in FIG. 12 it is assumed that aps_num_sao_unit_in_height_minus1=2 and the aps_num_sao_unit_in_width_minus1=3. This means that there are three SAO units in height direction, and four SAO units in width direction. In the figure, the dashed lines represent the boundaries of the SAO units (region boundaries), before having been aligned with LCU boundaries.

Figure 13:
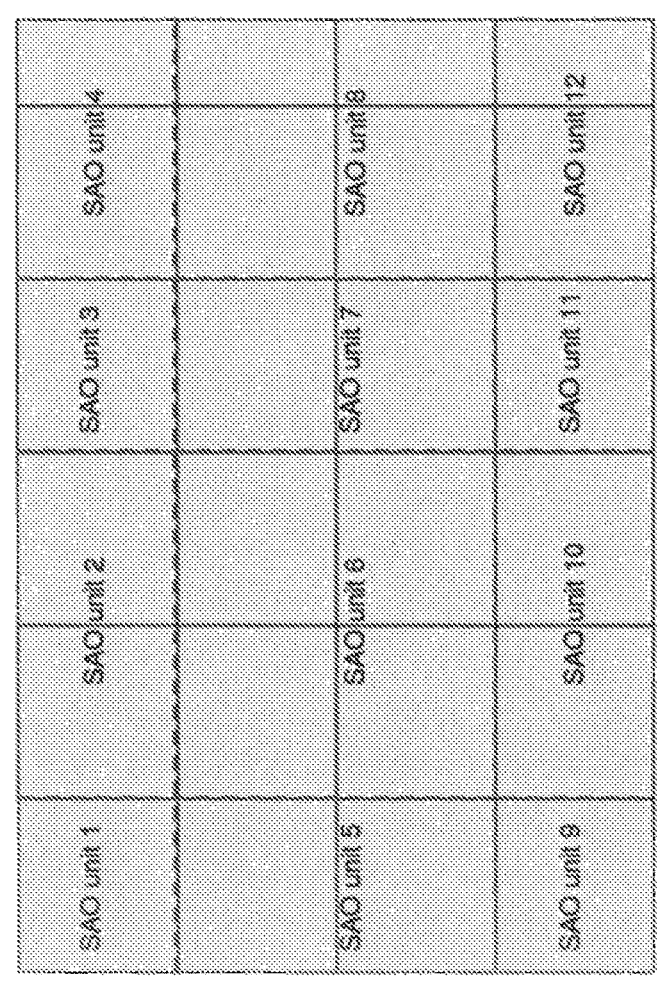

The result of the applying of the first exemplary mapping function in the example of FIG. 12 is shown in FIG. 13. Namely, FIG. 13 shows the resulting LCU groups (SAO units) according to an LCU grouping method of the first exemplary mapping function.

The result of applying said mapping function are LCU groups the area sizes of which are close to each other. Such a property is desirable since it facilitates region filter adaptation. However, the resulting region sizes are still not exactly equal to each other, due to the requirement that the filter regions should be aligned with the LCU boundaries. The illustrated mapping function takes into account the fact that there can be incomplete LCUs at the right and bottom frame boundaries (in the present case: at the right boundary).

In FIG. 13, SAO unit boundaries are once more shown by dashed lines. Since they coincide with LCU boundaries, the SAO unit boundaries are shown in FIG. 13 by an overlay of a thin full line and a slightly wider dashed line. LCU boundaries that are not SAO unit boundaries at the same time, are shown as thin full lines only.

More specifically, the operation for obtaining the result of FIG. 13 based on the input illustrated in FIG. 12 by means of the rules of the first exemplary mapping function, will be described below. In accordance with FIG. 12, the inputs of the derivation process are a luma location (xC, yC), specifying the top-left luma sample of a current Largest Coding Unit (LCU) relative to the top-left luma sample of the current picture, a parameter regionHeight that is set equal to the value (frame height/(aps_num_sao_unit_in_height_minus1+1)), a parameter regionWidth that is set equal to the value of (frame width/(aps_num_sao_unit_in_width_minus1+1), a parameter lcuWidth specifying the width of the current LCU in luma samples, and a parameter lcuHeight specifying the height of the current LCU in luma samples.

As output of the derivation process are derived parameters saoUnitId_x and saoUnitId_y, which describe the index of the SAO parameter unit in the x- and y-directions. Although parameters are defined in accordance with the equations $$saoUnitId\_x = round((lcuWidth/2 + xC)/regionWidth)$$

$$saoUnitId\_y = round(lcuHeight/2 + yC)/regionHeight)$$

In the syntax structure of the present invention, illustrated in FIG. 9, the filter parameter unit applied to the current LCU is given by sao_unit_vlc(saoUnitId_x,saoUnitId_y,0).

It is noted that instead of the round( ) function, a ceil( ) or floor( ) can be used as well.

An alternative second example of a mapping function will be illustrated below with reference to FIG. 14.

The mapping function in accordance with the second example applies the following two rules:
1. Find the width and height of the LCU groups based on the number of LCUs (illustrated in FIG. 12) as follows:

lcuGroupHeight=floor(number of LCU in picture height/(aps_num_sao_unit_in_height_minus1+1))

lcuGroupWidth=floor(number of LCU in picture width/(aps_num_sao_unit_in_width_minus1+1))

It is noted that instead of the floor( ) function, a ceil( ) or round( ) can be used as well.

2. Assigning the LCU to an SAO parameter unit using the following equations:

saoUnitItId_x=min(ceil(lcu_x/lcuGroupWidth),(aps_num_sao_unit_in_width_minus1+1))

saoUnitId_y=min(ceil(lcu_y/lcuGroupHeight),(aps_num_sao_unit_in_height_minus1+1)).

In the foregoing equations, lcu_x and lcu_y mean the coordinates of a current LCU (i.e. the sequential number of the LCU counted from the right top LCU having co-ordinates (lcu_x, lcu_y)=(1, 1)). It is further noted that instead of the ceil( ) function, floor( ) or round( ) functions are equally applicable.

In the syntax structure of the present invention, illustrated in FIG. 9, the filter parameter unit applied to the current LCU is given by sao_unit_vlc(saoUnitId_x,saoUnitId_y,0).

Figure 14:
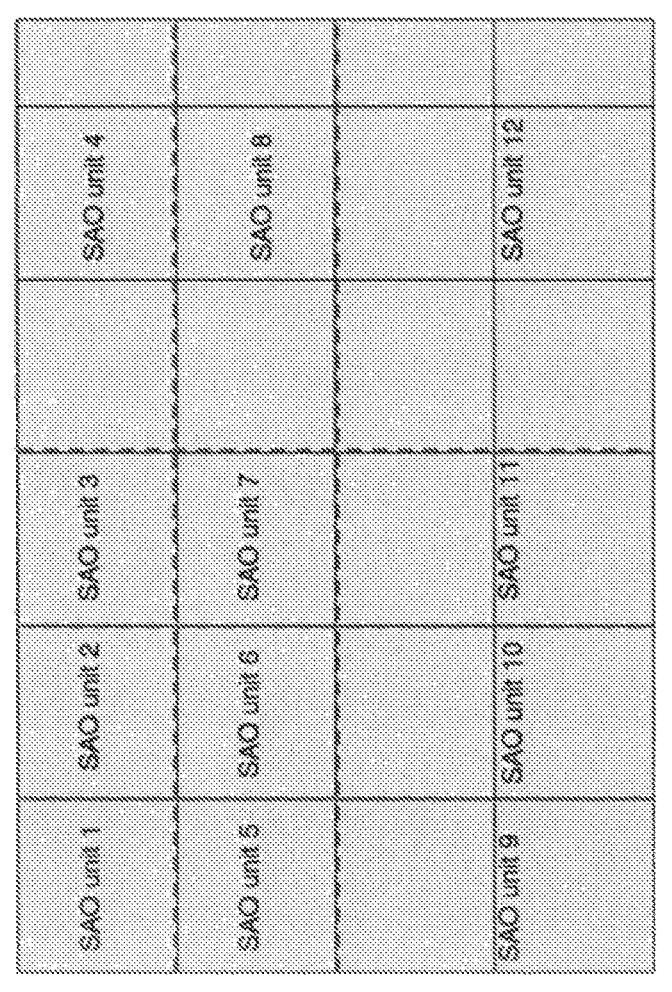

The LCU groups resulting from applying the second exemplary mapping function on the frame as illustrated in FIG. 12 is shown in FIG. 14. As can be seen therefrom, the resulting LCU groups (SAO units) are different to those derived in FIG. 13, based on the first exemplary mapping function. In particular, the sizes of the filtering regions differ more from each other in accordance with the second exemplary mapping function of FIG. 14, as compared to the first exemplary mapping function of FIG. 13. However, the second exemplary mapping function allows an easier implementation in some commonly used architectures.

The same mapping function that is used in the decoder should be used in the encoder for frame partitioning as well in order to achieve identical reconstructed images. The encoder would be implemented in such a way that it tries all LCU grouping possibilities that can be achieved by the mapping function, and picks the best LCU grouping possibility. The comparison of the LCU grouping possibilities can be based on a cost function according to a rate-distortion measure. In other words the LCU group size can be decided by the encoder based on the following rate and distortion measures:

bitrate increase associated with transmission of filter parameters and the amount of reduction in the coding noise resulting from the filtering operation.

In the following, the main benefit that can be achieved by means of the present invention will be summarized.

Firstly, the extensive overhead of LCU-based filter parameter syntax can be mitigated. Especially, when the LCU size is small, multiple LCUs can be grouped together in rectangular filter units restricting the overhead of parameter sets over a larger filter design area.

Usually, frame-based filter parameter estimation is applied when the filter parameters are signaled in the APS. The invented mapping scheme of filter parameters offers the possibility of partitioning a frame into regions of multiple LCUs, where a single parameter unit is generated for each region. Therefore, the scheme in accordance with the present invention reduces the parameter signaling overhead and is more suitable for frame-based filter estimation process.

In addition, with the help of the scheme of the invention, the filter parameters (in particular: SAO and ALF parameters) can be signaled in the APS independent of the actual frame sizes since the filter parameters are later mapped to the actual frame. Therefore, with the help of the scheme according to the present invention, a scalable coding is supported automatically.

In the case of spatial scalability, the video sequence contains pictures of multiple sizes. The filter parameters in the same APS can be mapped to different frames in a sequence with different frame sizes.

Figure 15:
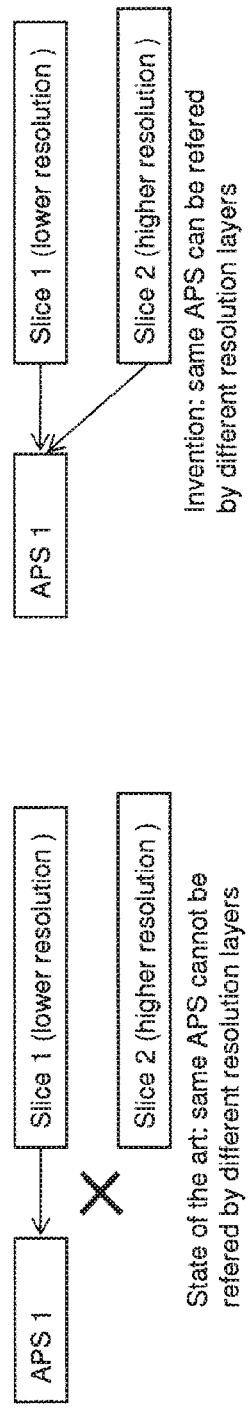
FIG. 15 provides an illustration of improved referencing possibilities on the basis of the present invention.

As a result, filter parameters that are signaled in the APS can be used by both lower resolution and higher resolution pictures in the scalable video sequence. The latter additional improvement that can be achieved by means of the present invention is illustrated in FIG. 15. On the left hand side of FIG. 15, the situation in accordance with the state of the art is illustrated. Since the same APS cannot be referred to by different resolution layers, in the state of the art APS 1 is not applicable to slice 2 corresponding to higher resolution.

In contrast, since in accordance with the present invention the same APS can be referred to by different resolution layers, in the present invention APS 1 also supports slice 2 corresponding to higher resolution, as illustrated on the right hand side of FIG. 15.

Finally, with the help of the scheme of the invention, the filter parameters (in particular: SAO and ALF parameters) that are signaled in an APS can be used by different picture slices that have different LCU and picture sizes. In particular in a video coded bitstream two different picture slices can have different LCU and frame sizes which are determined by an SPS. Since filter parameters are signaled independent from LCU and frame size, two different picture slices having different LCU or frame sizes can refer to the same APS and use the same filter parameters.

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Embodiment A

Figure 16:
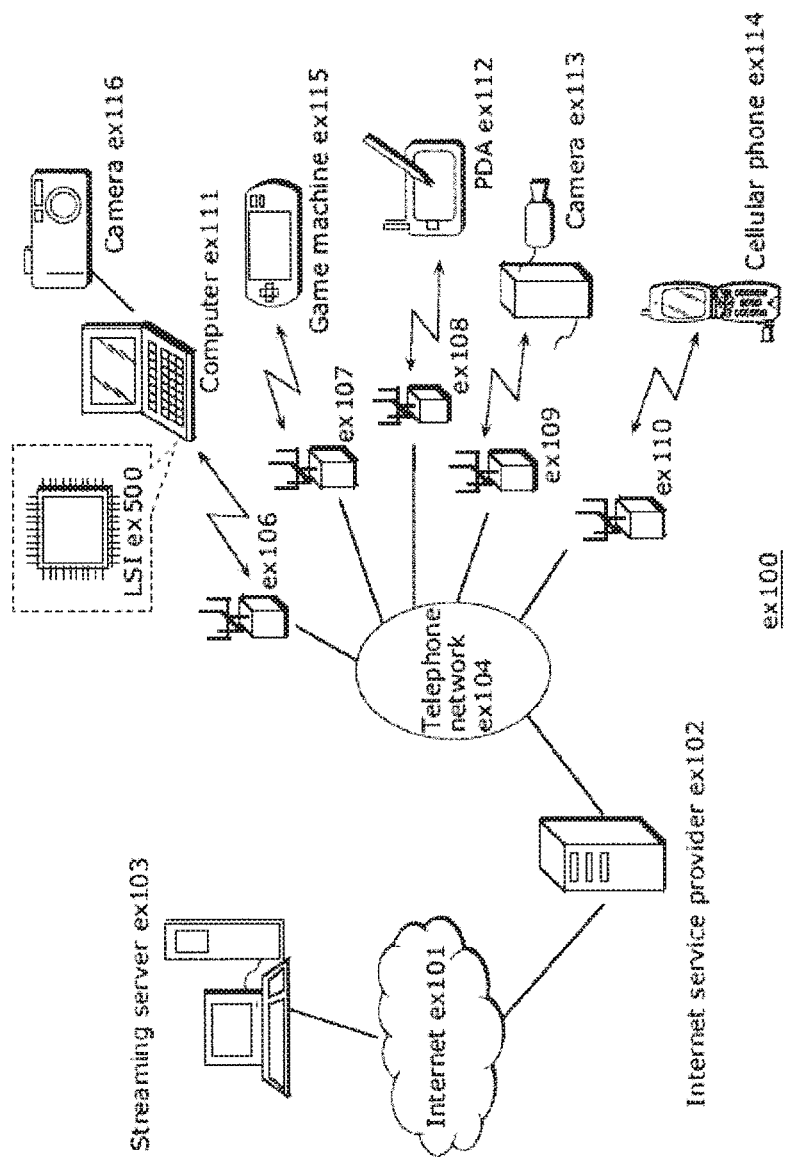
FIG. 16 shows an overall configuration of a content providing system for implementing content distribution services.

FIG. 16 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 16, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 17:
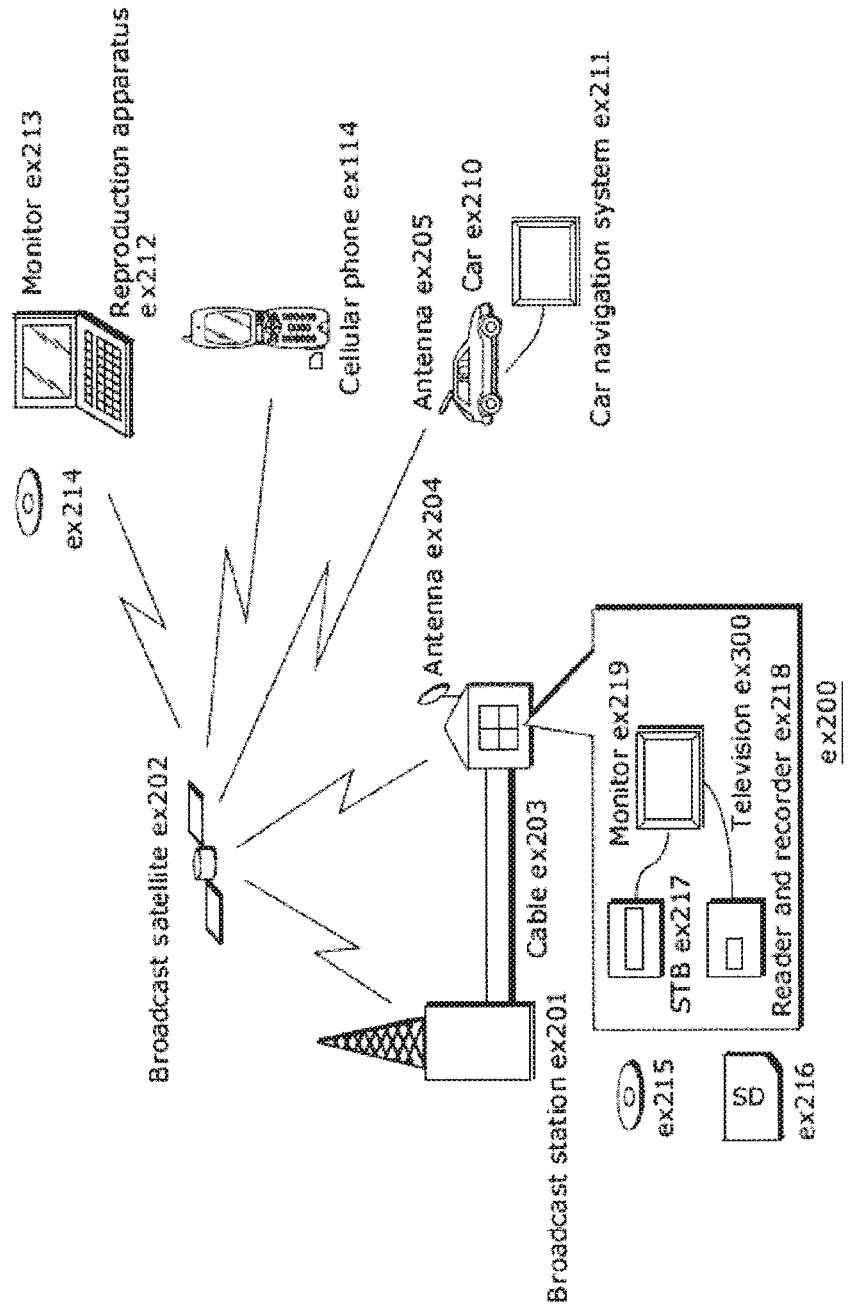
FIG. 17 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 17. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present invention).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 18:
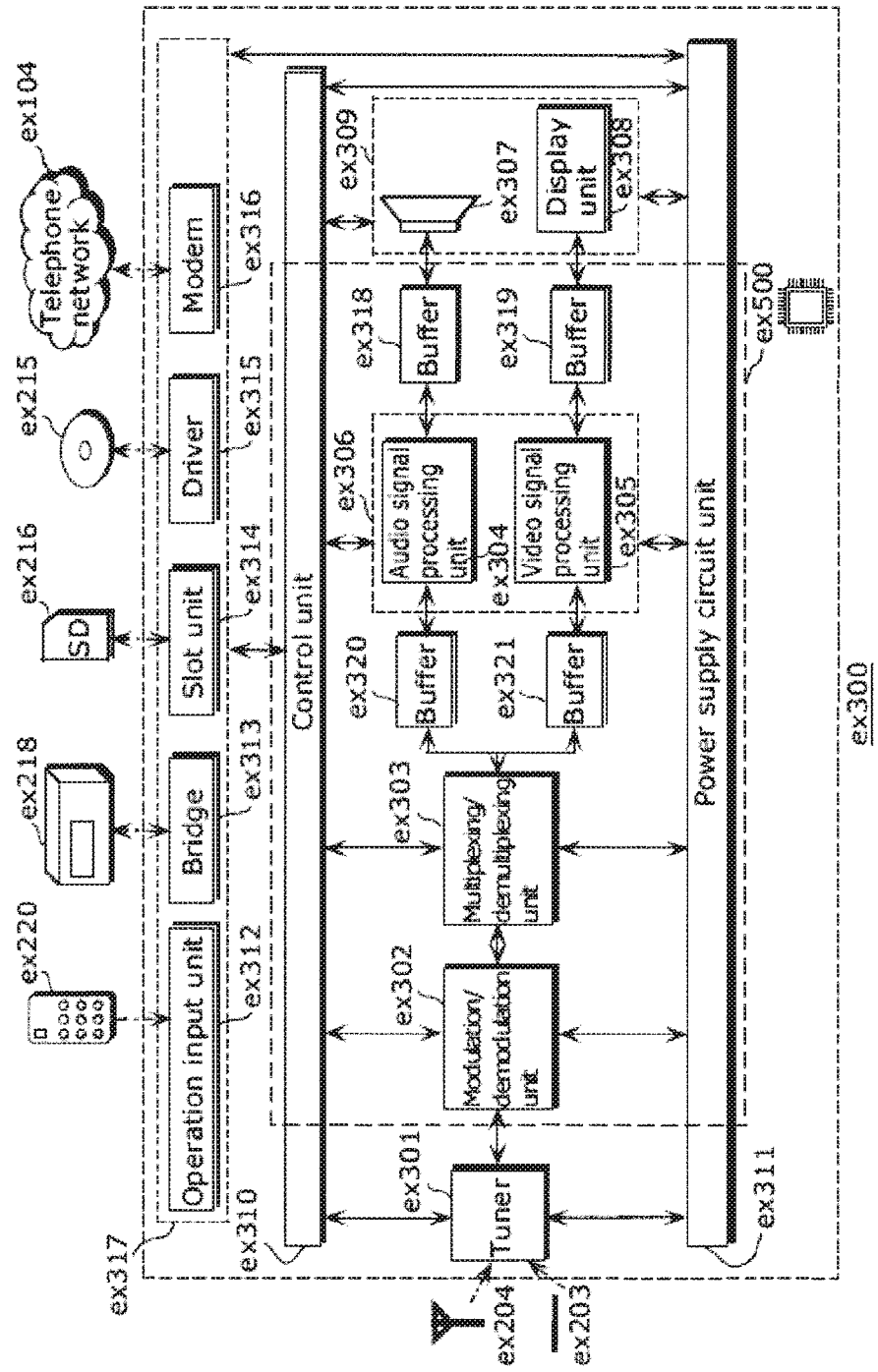
FIG. 18 shows a block diagram illustrating an example of a configuration of a television.

FIG. 18 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present invention); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 19:
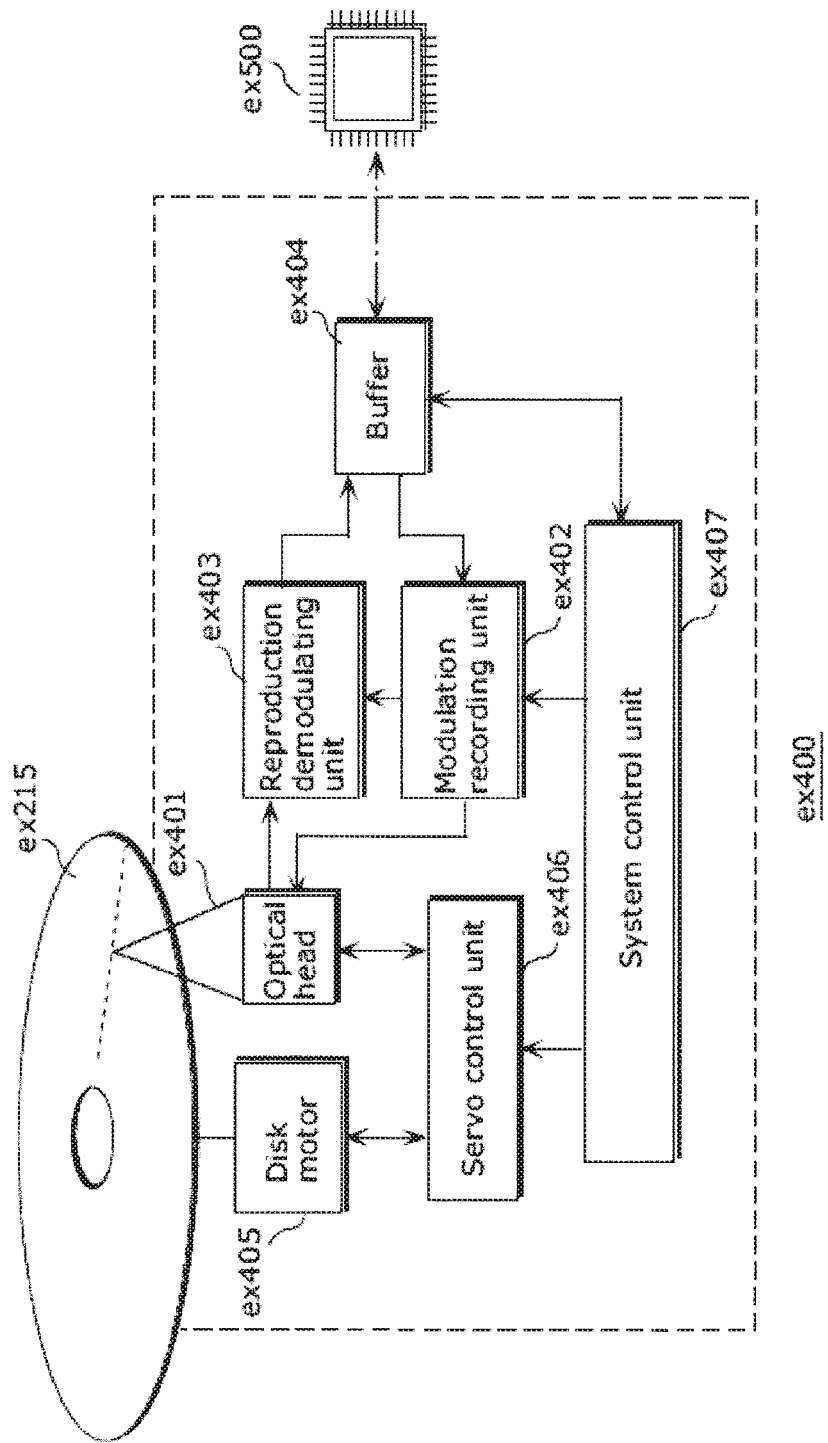
FIG. 19 shows a block diagram illustrating an example of a configuration of an information reproducing/recording unit that reads and writes information from and on a recording medium that is an optical disk.

As an example, FIG. 19 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 20:
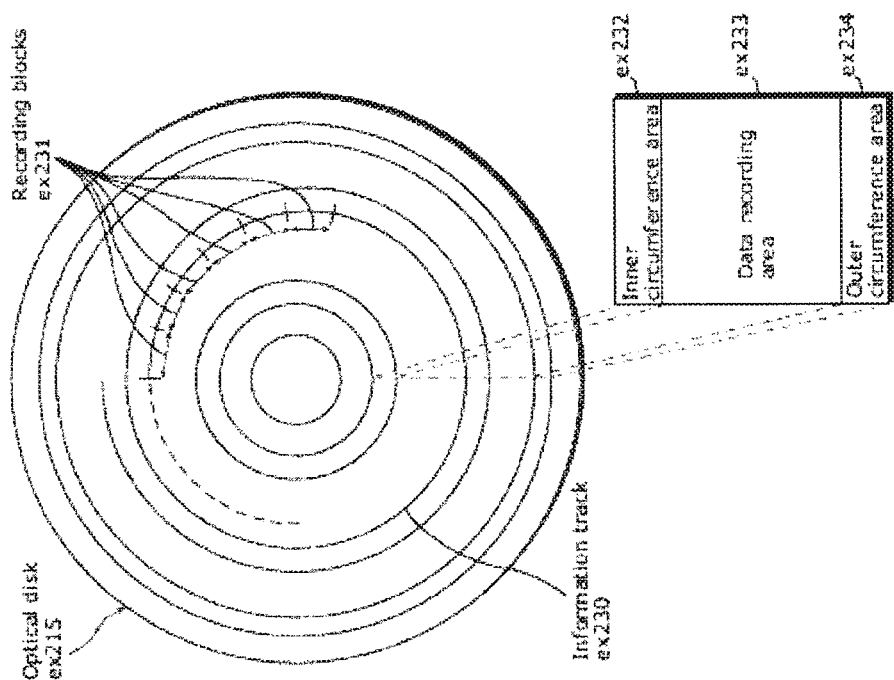
FIG. 20 shows an example of a configuration of a recording medium that is an optical disk.

FIG. 20 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 18. The same will be true for the configuration of the computer ex111, the cellular phone ex114, and others.

Figure 21A:
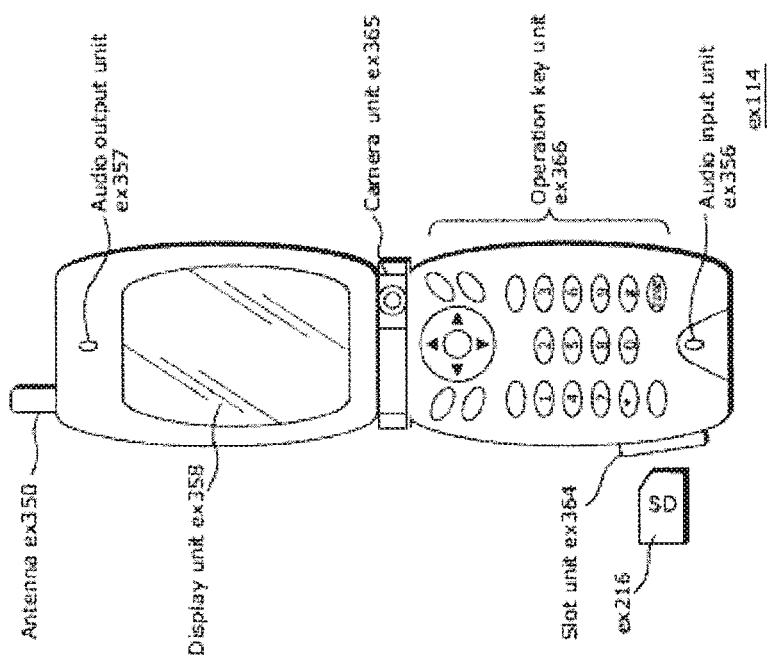
FIG. 21A shows an example of a cellular phone.

FIG. 21A illustrates the cellular phone ex114 that uses the moving picture coding method and the moving picture decoding method described in embodiments. The cellular phone ex114 includes: an antenna ex350 for transmitting and receiving radio waves through the base station ex110, a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 21B:
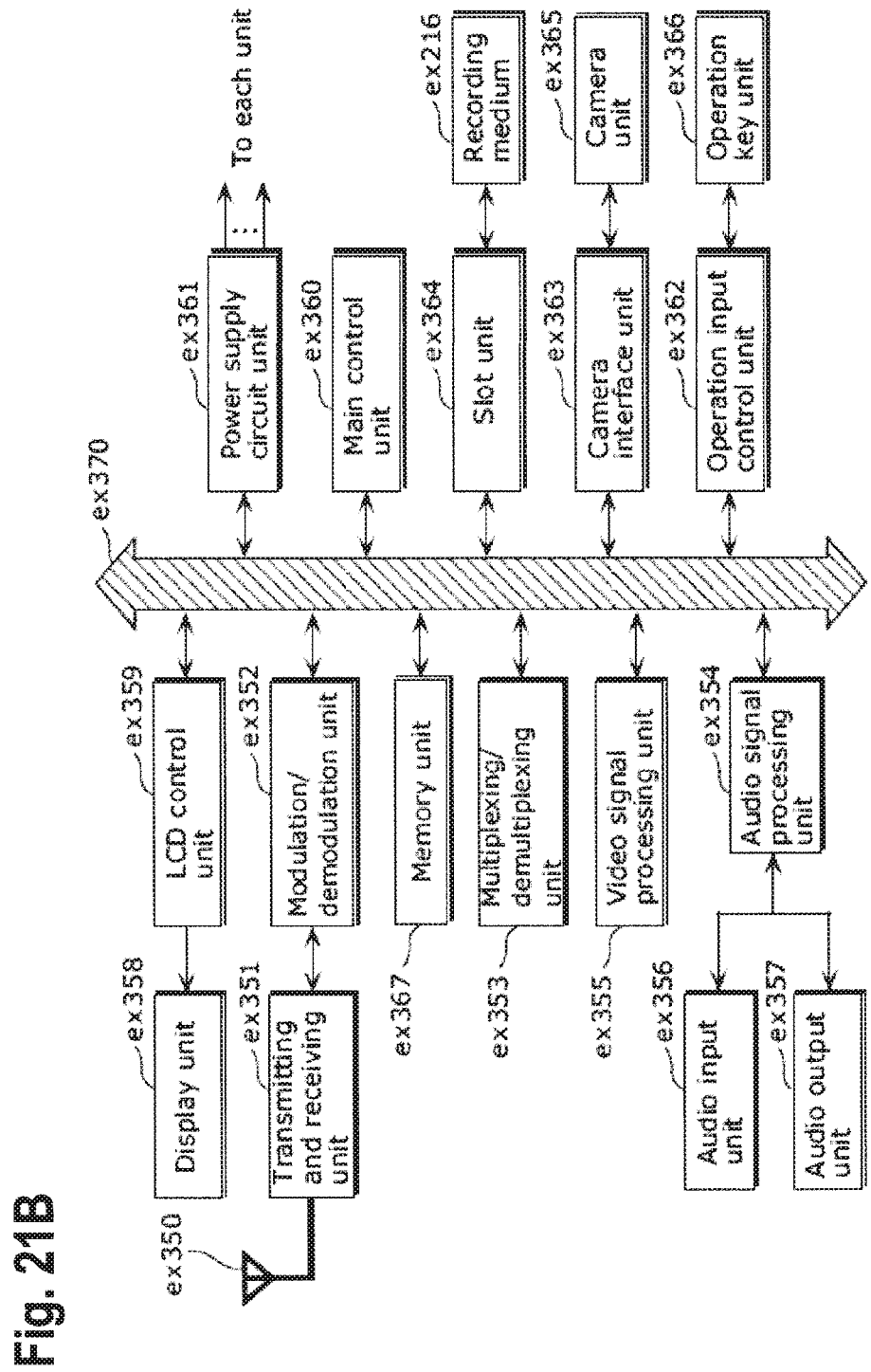
FIG. 21B is a block diagram showing an example of a configuration of a cellular phone.

Next, an example of a configuration of the cellular phone ex114 will be described with reference to FIG. 21B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment B

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 22 illustrates a structure of the multiplexed data. As illustrated in FIG. 22, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 23:
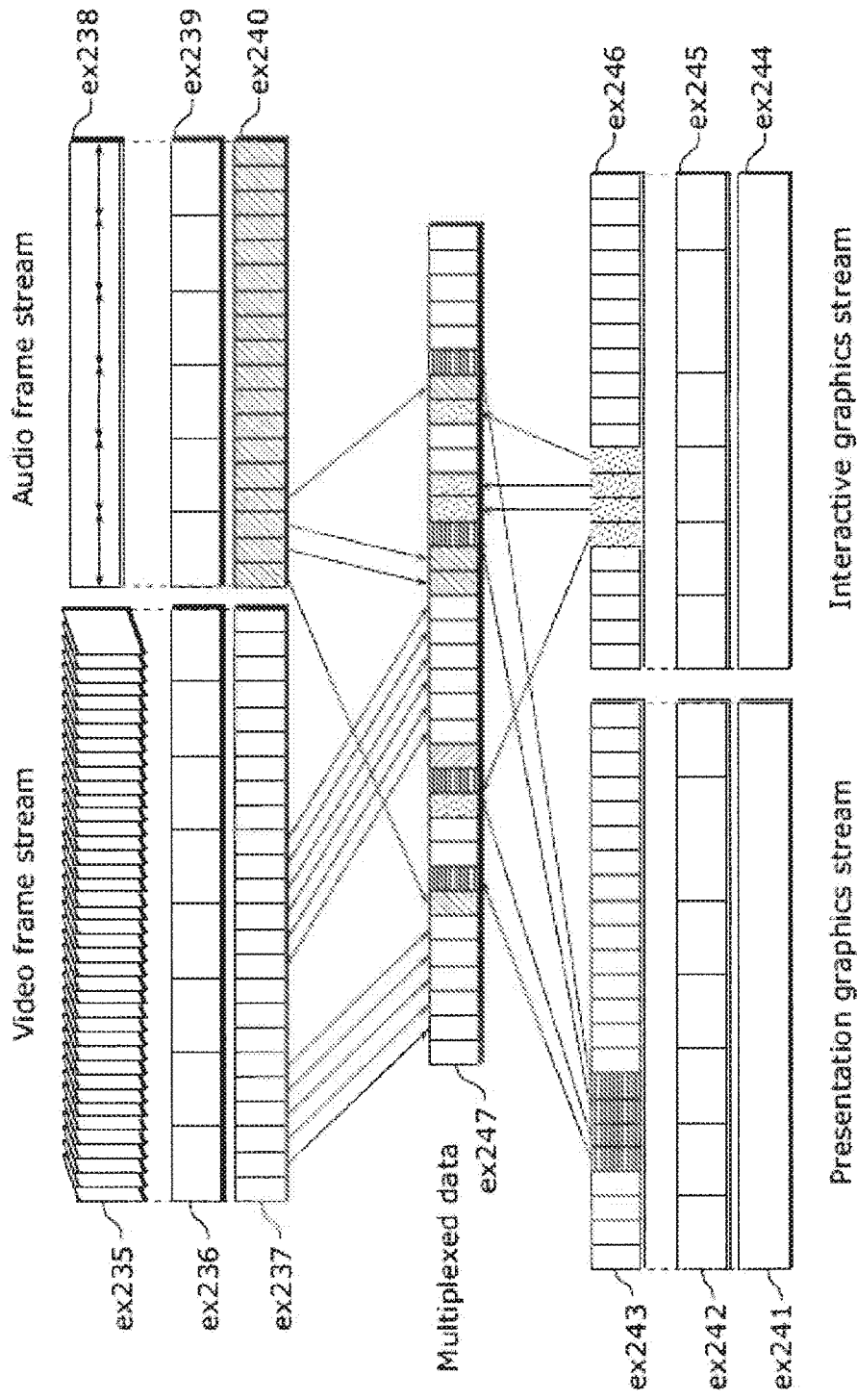
FIG. 23 schematically shows how each stream is multiplexed in multiplexed data.

FIG. 23 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 24:
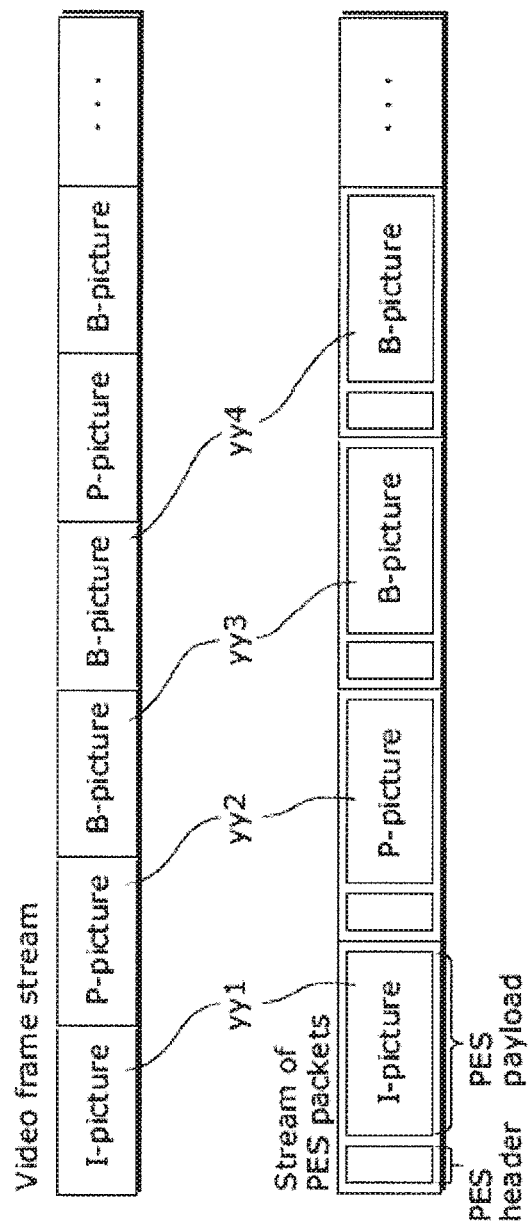
FIG. 24 shows how a video stream is stored in a stream of PES packets in more detail.

FIG. 24 illustrates how a video stream is stored in a stream of PES packets in more detail. The first bar in FIG. 24 shows a video frame stream in a video stream. The second bar shows the stream of PES packets. As indicated by arrows denoted as yy1, yy2, yy3, and yy4 in FIG. 24, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 25:
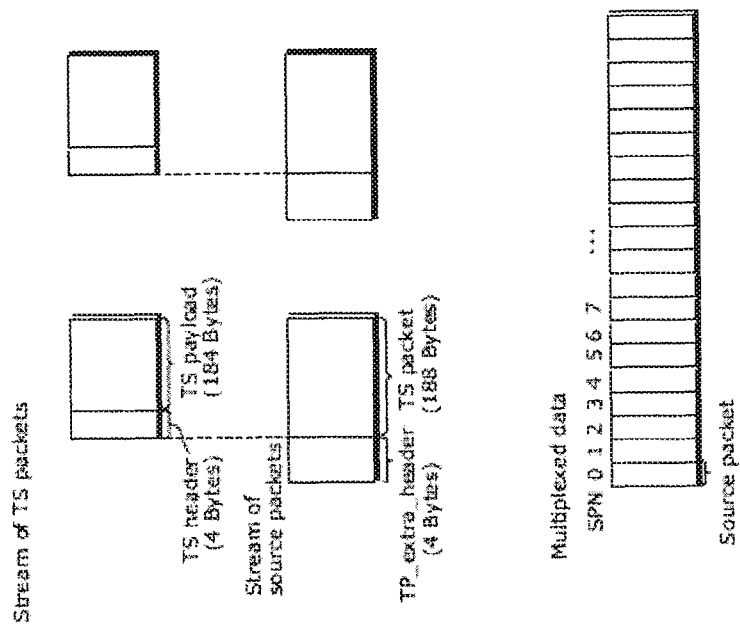
FIG. 25 shows a structure of TS packets and source packets in the multiplexed data.

FIG. 25 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 25. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 26:
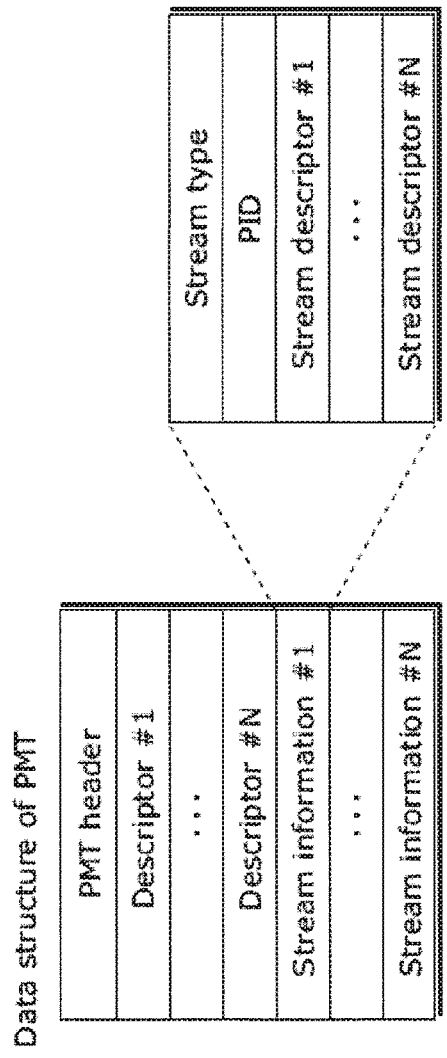
FIG. 26 shows a data structure of a PMT.

FIG. 26 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 27:
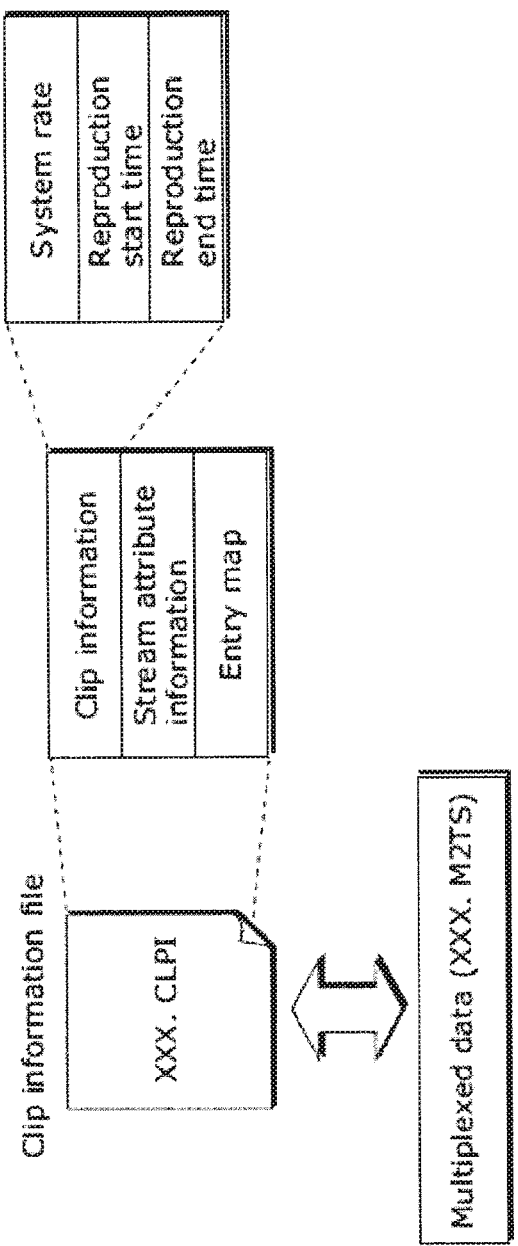
FIG. 27 shows an internal structure of multiplexed data information.

Each of the multiplexed data information files is management information of the multiplexed data as shown in FIG. 27. The multiplexed data information files are in one to one correspondence with the multiplexed data, and each of the files includes multiplexed data information, stream attribute information, and an entry map.

As illustrated in FIG. 27, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 28:
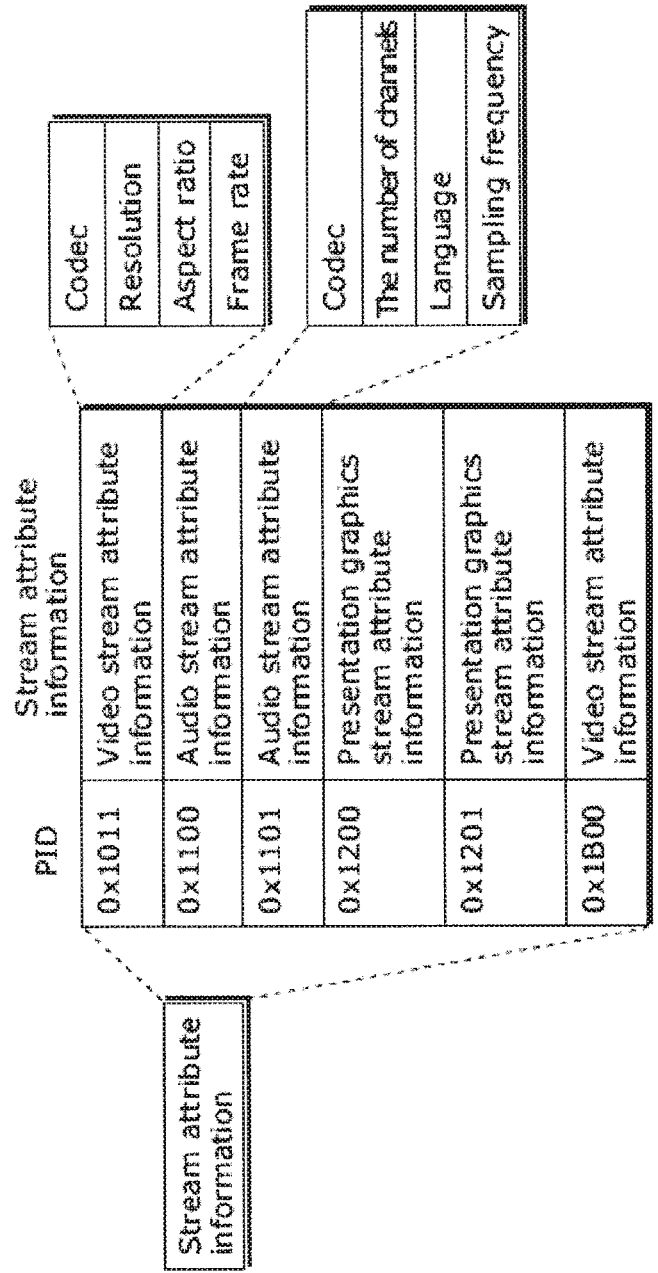
FIG. 28 shows an internal structure of stream attribute information.

As shown in FIG. 28, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 29:
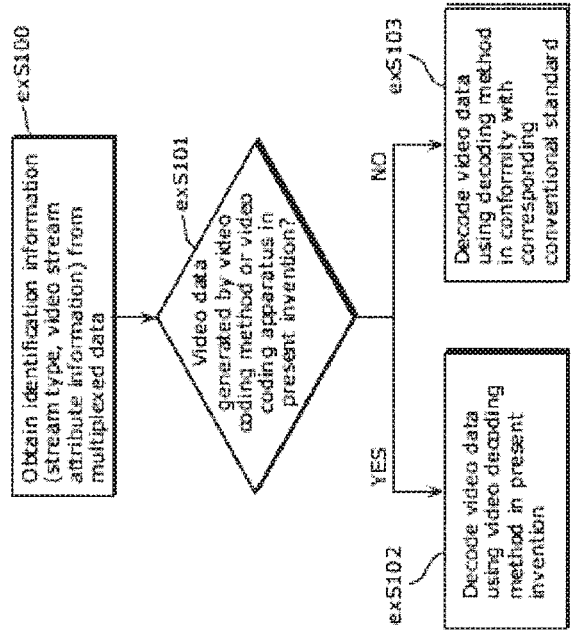
FIG. 29 shows steps for identifying video data.

Furthermore, FIG. 29 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment C

Figure 30:
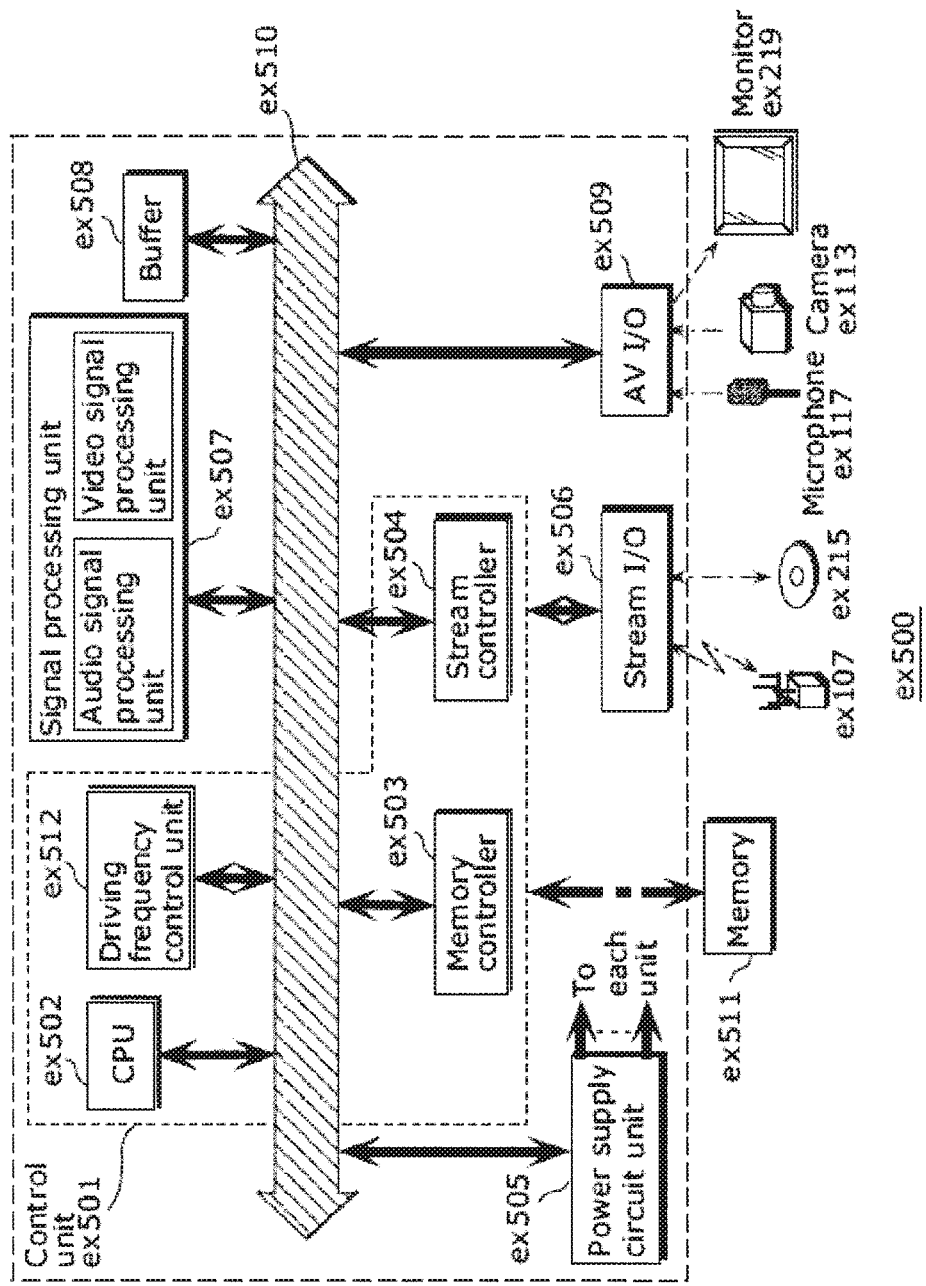
FIG. 30 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 30 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream 10 ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSTs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment D

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 31:
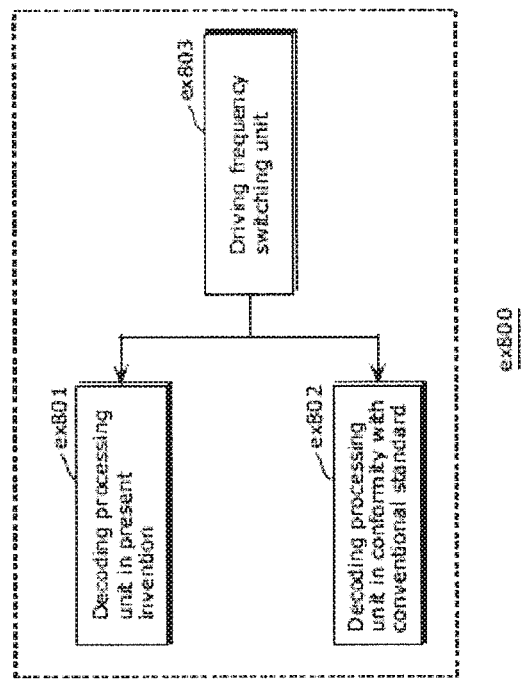
FIG. 31 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 31 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 30. Here, each of the decoding processing unit ex801 that executes the moving picture decoding method described in each of embodiments and the decoding processing unit ex802 that conforms to the conventional standard corresponds to the signal processing unit ex507 in FIG. 30. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment B is probably used for identifying the video data. The identification information is not limited to the one described in Embodiment B but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 33. The driving frequency can be selected by storing the look-up table in the buffer ex508 and in an internal memory of an LSI, and with reference to the look-up table by the CPU ex502.

Figure 32:
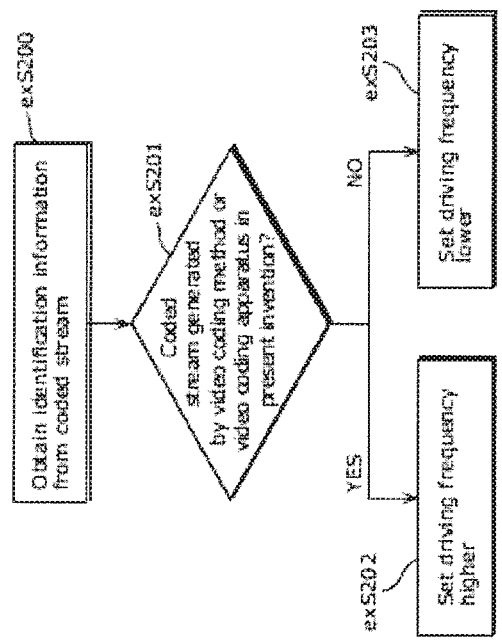
FIG. 32 shows steps for identifying video data and switching between driving frequencies.

FIG. 32 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment E

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 34A:
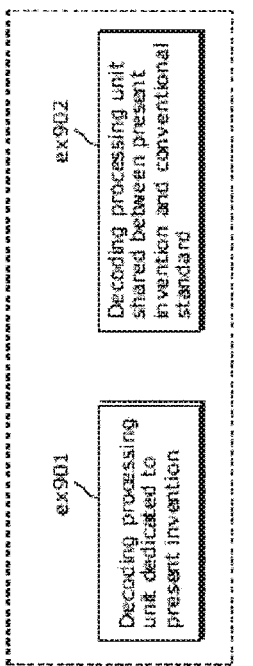
FIG. 34A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 34A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present invention. Since the aspect of the present invention is characterized by inverse quantization in particular, for example, the dedicated decoding processing unit ex901 is used for inverse quantization. Otherwise, the decoding processing unit is probably shared for one of the entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 34B:
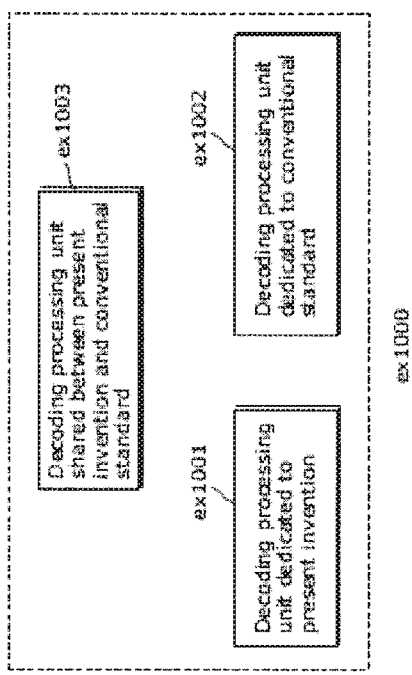
FIG. 34B is a diagram showing another example of a configuration for sharing a module of the signal processing unit.

Furthermore, ex1000 in FIG. 34B shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

In summary, the present invention provides an improved video encoding and decoding method, which maintains the advantages of LCU-based filter parameter signaling as compared to frame-based filter parameter signaling, but considerably reduces signaling overhead. Therefore, signaling syntax is modified by grouping LCUs (Largest Coding Units) together for signaling employing a mapping function. Consequently, filter parameters no longer need to be signaled for each single LCU, but for a group of several LCUs. The syntax structure of the invention avoids redundancies present in the state of the art as far as possible and thus increases the information content of the syntax elements. At the decoder side, the mapping function is applied to infer information about the filter parameters to be applied to a current LCU from information encoded in different syntax structures.

The invention claimed is:

1. An encoding method for encoding a picture into a bitstream on the basis of Largest Coding Units, the encoding method comprising:

deriving filter parameters for a current group to be applied in encoding a current Largest Coding Unit in the current group by applying, to a predetermined mapping function, (i) group information specifying the number of groups in the picture, each of the groups including one or more Largest Coding Units, and (ii) unit information specifying the number of the Largest Coding Units in the picture, wherein the mapping function provides information for specifying filter parameters to be applied for each of the Largest Coding Units in the picture, wherein a first syntax structure of the bitstream indicates the group information, and a second syntax structure of the bitstream indicates the unit information, and wherein the mapping function (i) partitions the picture into equally spaced regions according to a region height derived according to a number of Largest Coding Units in a height direction of the picture and a region width derived according to a number of Largest Cording Units in a width direction of the picture, (ii) determines a center point of each of the Largest Coding Units in the picture, and (iii) assigns each of the Largest Cording Units in the picture to one of the equally spaced regions according to the determined center point of the Largest Coding Unit.

\* \* \* \* \*

UNITED STATES PATENT AND TRADEMARK OFFICE
CERTIFICATE OF CORRECTION

PATENT NO. : 11,089,336 B2  
APPLICATION NO. : 16/778239  
DATED : August 10, 2021  
INVENTOR(S) : Semih Esenlik et al.

Page 1 of 1

It is certified that error appears in the above-identified patent and that said Letters Patent is hereby corrected as shown below:

On the Title Page

In Item (72), Line 1, "Semih Esenlik, Nazilli (FR);" should read --Semih Esenlik, Nazilli (TR);--.

Signed and Sealed this  
Seventh Day of December, 2021

Drew Hirshfeld  
*Performing the Functions and Duties of the*  
*Under Secretary of Commerce for Intellectual Property and*  
*Director of the United States Patent and Trademark Office*